United States Patent
Funk et al.

(10) Patent No.: US 9,144,833 B2
(45) Date of Patent: Sep. 29, 2015

(54) DUAL-PHASE HOT EXTRUSION OF METALS

(71) Applicants: Philip O. Funk, North East, PA (US); Douglas S. Winner, Erie, PA (US); Seth Lafountain Wyse, Erie, PA (US); Benjamin Anthony Laemmerhirt, North East, PA (US)

(72) Inventors: Philip O. Funk, North East, PA (US); Douglas S. Winner, Erie, PA (US); Seth Lafountain Wyse, Erie, PA (US); Benjamin Anthony Laemmerhirt, North East, PA (US)

(73) Assignee: THE ELECTRIC MATERIALS COMPANY, North East, PA (US)

( * ) Notice: Subject to any disclaimer, the term of this patent is extended or adjusted under 35 U.S.C. 154(b) by 38 days.

(21) Appl. No.: 13/828,605

(22) Filed: Mar. 14, 2013

(65) Prior Publication Data
US 2014/0260489 A1    Sep. 18, 2014

(51) Int. Cl.
*B21C 23/21* (2006.01)
*B21C 27/00* (2006.01)
*B21C 23/08* (2006.01)
*B21C 27/02* (2006.01)
*B21C 23/22* (2006.01)
*B21C 37/04* (2006.01)
*B21C 23/12* (2006.01)
(Continued)

(52) U.S. Cl.
CPC ............. *B21C 23/212* (2013.01); *B21C 23/002* (2013.01); *B21C 23/08* (2013.01); *B21C 23/12* (2013.01); *B21C 23/22* (2013.01); *B21C 25/02* (2013.01); *B21C 27/00* (2013.01); *B21C 27/02* (2013.01); *B21C 29/04* (2013.01); *B21C 37/047* (2013.01); *C22C 1/005* (2013.01)

(58) Field of Classification Search
CPC ........ B21C 23/22; B21C 23/08; B21C 25/02; B21C 27/00; B21C 27/02; B21C 23/212; B21C 23/12; B21C 23/002; B21C 29/04; C22C 1/005
USPC .................... 72/258, 261, 268, 272, 377, 467
See application file for complete search history.

(56) References Cited

U.S. PATENT DOCUMENTS 3,362,803 A     1/1968  Dannohl et al.
4,726,105 A  *  2/1988  Yamanaka et al. ........... 29/527.1
(Continued)

FOREIGN PATENT DOCUMENTS

EP         0 042 814 A2    12/1981
EP         2 289 641 B1    11/2012
WO      2009/091109 A1     7/2009

OTHER PUBLICATIONS

Prabhakar R. Bandaru; "Electrical Properties and Applications of Carbon Nanotube Structures;" Journal of Nanoscience and Nanotechnology; vol. 7, pp. 1-29, 2007.
(Continued)

*Primary Examiner* — David B Jones
(74) *Attorney, Agent, or Firm* — Mayer Brown LLP

(57) ABSTRACT

The present disclosure provides a method of dual-phase hot metal extrusion comprising (i) providing a load carrier made of a first metal material, wherein the load carrier comprises one or more load chambers containing a second metal material, wherein the melting point of the second metal material is lower than the melting point of the first metal material, (ii) heating the load carrier to a temperature above the melting point of the second metal material and suitable for extrusion of the load carrier, and (iii) extruding the load carrier to form an extruded product. The present disclosure also provides apparatuses for accomplishing the dual-phase hot extrusion of metals and products resulting from such processes.

25 Claims, 14 Drawing Sheets

(51) Int. Cl.
*B21C 23/00* (2006.01)
*B21C 25/02* (2006.01)
*B21C 29/04* (2006.01)
*C22C 1/00* (2006.01)

(56) References Cited

U.S. PATENT DOCUMENTS

| | | | | |
|---|---|---|---|---|
| 5,108,492 | A * | 4/1992 | Kiyota et al. | 75/246 |
| 5,496,425 | A * | 3/1996 | Gallagher, Jr. | 72/364 |
| 6,591,654 | B2 * | 7/2003 | Kwok | 72/269 |
| 6,637,250 | B2 * | 10/2003 | Plata et al. | 72/272 |
| 6,808,003 | B2 * | 10/2004 | Raghunathan et al. | 72/262 |
| 7,285,761 | B1 * | 10/2007 | Terziakin | 219/633 |
| 8,347,944 | B2 * | 1/2013 | Nayfeh et al. | 164/113 |
| 8,584,501 | B2 * | 11/2013 | Kim et al. | 72/264 |
| 2007/0234545 | A1 | 10/2007 | Hong et al. | |
| 2010/0203351 | A1 | 8/2010 | Nayfeh | |
| 2013/0062572 | A2 | 3/2013 | Shugart et al. | |

OTHER PUBLICATIONS

Su et al.; "Effects of Processing Parameters on the Fabrication of Copper Cladding Aluminum Rods by Horizontal Core-Filling Continuous Casting;" Metallurgical and Materials Transactions B; vol. 42B, pp. 104-113; 2011.

Su et al.; "Interfacial Microstructure and Bonding Strength of Copper Cladding Aluminum Rods Fabricated by Horizontal Core-Filling Continuous Casting;" Metallurgical and Materials Transactions A; vol. 42A, pp. 4088-4099; 2011.

"Nano-engineered ultra-conductive nanocomposite copper wire;" Cleveland State University; Technology Transfer Office; Downloaded on Feb. 13, 2014; 1 page. https://www.csuohio.edu/research/technologytransfer/ab_nano_engineering.html.

"Commercialization Strategy for Nano-Composite Ultra Conductive Metals;" Cleveland State University; Technology Transfer Office; Downloaded on Feb. 13, 2014; 2 pages. https://www.csuohio.edu/research/technologytransfer/docs/Commercialization-Strategy-for-Ultra-Conductive-Metals.pdf.

Yu et al.; "Formation of nanostructured eutectic network in $\alpha$-Al2O3 reinforced Al—Cu alloy matrix composite;" Acta Materialia; vol. 51; pp. 3445-3454; 2003.

"Innovative Concepts for Lightweight Composite Sandwich Systems for Complex Shapes;" SBIR/STTR Department of Defense; Agency Tracking No. N10B-050-0020; Downloaded on Feb. 13, 2014; 2 pages. http://www.sbir.gov/sbirsearch/detail/377511.

Lynn Stanley; "A New Material is Born;" Modern Metals; Covetics; 2013; Downloaded on Feb. 13, 2014; 4 pages. http://www.modernmetals.com/item/11389-a-new-material-is-born.html.

Salamanca-Riba; "A New Type of Carbon Nanostructure Formed Within a Metal-Matrix;" Paper presented at Tech Connect World; Jun. 18-12, 2012; Santa Clara; CA; 5 pages.

Steve Bennish; "Production to start later this year for covetics;" Dayton Daily News; Mar. 12, 2013; Downloaded on Feb. 13, 2014; 2 pages. http://www.daytondailynews.com/news/business/production-to-start-later-this-year-for-covetics/nWmMQ/.

Subramaniam et al.; "One hundred fold increase in current carrying capacity in a carbon nanotube-copper composite;" Nat. Commun. 4:2202; doi: 10.1038/ncomms3202; 2013.

Savitskii et al; "Structure Formation During the Sintering of Aluminum-Copper Alloys;" Soviet Powder Metallurgy and Metal Ceramics; vol. 25; Issue 3; pp. 184-187; 1986.

Melis S. Gildengorn; "Theory and Practice of Co-Extrusion of Unequal Strength Materials;" Advanced Performance Materials, 2, 79-87; 1995.

Metals Handbook; "Power Metallurgy;" Published by: American Society for Metals; Ninth Edition; vol. 7; 1984; pp. 319-321.

ASM Handbook; "Metalworking: Bulk Forming;" Published by: ASM International; First Edition; vol. 14A; 2005; pp. 506-515.

Su et al.; "Numerical simulation of temperature field in horizontal core-filling continuous casting for copper cladding aluminum rods;" International Journal of Minerals, Metallurgy and Materials; vol. 20; No. 7; 2013; pp. 684-692.

International Search Report and Written Opinion of International Application No. PCT/US2014/025542 mailed on Oct. 23, 2014 (13 pages).

* cited by examiner

DUAL-PHASE HOT EXTRUSION OF METALS

FIELD

The present disclosure relates to dual-phase hot extrusion of metals and metal materials and the machines and apparatuses used for producing the same.

BACKGROUND

Generally, extrusion is the process by which a block or billet of metal is reduced in cross section and shaped by forcing it to flow through a die under high pressure. Most metals are hot extruded due to the large amount of forces required in extrusion. In a typical extrusion process, an extrusion billet is heated and placed in a container of a hydraulic extrusion press. A dummy block is placed between the ram of the extrusion press and the heated billet. The ram then applies pressure to the heated billet and forces the billet through a shaped die to form an extrusion product.

The physical properties of a metal may be advantageously influenced by the presence of one or more other metals. For example, the combination of two or more metals (i.e., alloying) may provide improved or changed thermal conductivity, electrical conductivity, or tensile properties in comparison to either of the pure metals. Accordingly, it is desirable to formulate metal materials containing more than one metal. This may be accomplished by casting, wherein each metal is melted to its molten form and then solidified together. This may also be accomplished by extrusion, wherein each metal is in its solid form. It has generally been considered, however, that hot extrusion in which a molten metal is contained within a solid metal carrier cannot be achieved due to the high extrusion forces and tendency for the molten metal to blow out of the solid metal carrier.

SUMMARY

Surprisingly, the processes and apparatuses described herein permit the controlled hot extrusion of a solid metal carrier comprising a molten metal or metal alloy. The extrusion of dual-phase hot metals, as described herein, is therefore a useful process by which new metal materials having modified thermal conductivity, electrical conductivity, or tensile properties may be formed. As used herein, the term "dual-phase" refers to the physical states of the extruded metals, not to their crystalline lattice structures. For example, in one embodiment of the present disclosure, a solid, metal comprising interior chambers containing molten metal may be extruded.

In one aspect, the disclosure describes a load carrier suitable for dual-phase hot metal extrusion made of a first metal material, wherein the load carrier comprises a load end, a blind end, and at least one load chamber having a depth extending axially from the load end towards the blind end, wherein the at least one load chamber comprises a load material and a void space, wherein the load material comprises a second metal material, the second metal material having a lower melting point than the melting point of the first metal material, and wherein the void space is configured to accommodate at least a portion of the second metal material in its molten form when the load carrier is heated.

In another aspect, the disclosure describes a load carrier suitable for dual-phase hot metal extrusion made of a metal material comprising copper, wherein the load carrier comprises a load end, a blind end, and at least one load chamber having a depth extending axially from the load end towards the blind end, wherein the at least one load chamber comprises a fluted spacer and a load material, wherein the load material comprises aluminum, antimony, magnesium, tin, zinc, or any combination thereof.

In another aspect, the disclosure describes a method of dual-phase hot metal extrusion comprising the steps of: (i) providing a load carrier made of a first metal material, wherein the load carrier comprises a load end, a blind end, and at least one load chamber having a depth extending axially from the load end towards the blind end, wherein the at least one load chamber comprises a load material and a void space, wherein the load material comprises a second metal material, the second metal material having a lower melting point than the melting point of the first metal material, and wherein the void space is configured to accommodate at least a portion of the second metal material in its molten form when the load carrier is heated; (ii) heating the load carrier to a temperature above the melting point of the second metal material but below the melting point of the first metal material to form a solid load carrier comprising a liquid metal in the at least one load chamber; and (iii) extruding the heated load carrier to provide an extruded product.

In still another aspect, the disclosure describes a method of dual-phase hot metal extrusion comprising the steps of: (i) providing a load carrier made of a first metal material, wherein the load carrier comprises a load end, a blind end, and at least one load chamber having a depth extending axially from the load end towards the blind end, wherein the at least one load chamber comprises a load material and a void space, wherein the load material comprises a second metal material, the second metal material having a lower melting point than the melting point of the first metal material, and wherein the void space is configured to accommodate at least a portion of the second metal material in its molten form when the load carrier is heated; (ii) heating the load carrier to a temperature above the melting point of the second metal material but below the melting point of the first metal material to form a solid load carrier comprising a liquid metal in the at least one load chamber; (iii) extruding the heated load carrier to provide a first extruded product; (iv) providing a second load carrier made of the first metal material, wherein the load carrier comprises a load end, a blind end, and at least one load chamber having a depth extending axially from the load end towards the blind end, wherein the at least one load chamber comprises a second load material, wherein the second load material is the first extruded material; (v) heating the second load carrier to a temperature suitable for extrusion; and (vi) extruding the second load carrier to provide a second extruded product.

In a further aspect, the present disclosure describes an extrusion product made of a primary metal comprising about 20 filaments to about 2,000 filaments of a second metal material disposed through at least a portion of the length of the extruded metal product. In another aspect, the present disclosure is directed to an extruded metal product comprising about 1,000 filaments to about 10 million filaments of a second metal material disposed through at least a portion of the length of the extruded metal product.

In yet a further aspect, the present disclosure describes an extrusion tool comprising a first extrusion die, a second extrusion die, and a cooling cavity, wherein an extrusion transfer channel extends from the first extrusion die through the cooling cavity to the second extrusion die, wherein the portion of the extrusion transfer channel extending through the cooling cavity comprises at least one opening located between the first extrusion die and the second extrusion die, and wherein the cooling cavity comprises at least one cooling port configured to provide a cooling agent at the at least one opening of the extrusion transfer channel.

In another aspect, the present disclosure describes a method of dual-phase hot metal extrusion comprising the steps of: (i) providing a load carrier made of a first metal material, wherein the load carrier comprises a load end, a blind end, and at least one load chamber having a depth extending axially from the load end towards the blind end, wherein the at least one load chamber comprises a load material and a void space, wherein the load material comprises a second metal material, the second metal material having a lower melting point than the melting point of the first metal material, and wherein the void space is configured to accommodate at least a portion of the second metal material in its molten form when the load carrier is heated; (ii) heating the load carrier to a temperature above the melting point of the second metal material but below the melting point of the first metal material to form a solid load carrier comprising a liquid metal in the at least one load chamber; (iii) providing an extrusion tool comprising a first extrusion die, a second extrusion die, and a cooling cavity, wherein an extrusion transfer channel extends from the first extrusion die through the cooling cavity to the second extrusion die of the extrusion tool, wherein the portion of the extrusion transfer channel extending through the cooling cavity comprises at least one opening located between the first extrusion die and the second extrusion die, and wherein the cooling cavity comprises at least one cooling port configured to provide a cooling agent at the at least one opening of the extrusion transfer channel; (iv) providing a cooling agent through the at least one cooling port; and (v) extruding the heated load carrier through the extrusion tool to provide an extruded product.

In still another aspect, the present disclosure describes a method of dual-phase hot metal extrusion comprising the steps of: (i) providing a load carrier made of a first metal material, wherein the load carrier comprises a load end, a blind end, and at least one load chamber having a depth extending axially from the load end towards the blind end, wherein the at least one load chamber comprises a load material and a void space, wherein the load material comprises a second metal material, the second metal material having a lower melting point than the melting point of the first metal material, and wherein the void space is configured to accommodate at least a portion of the second metal material in its molten form when the load carrier is heated; (ii) heating the load carrier to a temperature above the melting point of the second metal material but below the melting point of the first metal material to form a solid load carrier comprising a liquid metal in the at least one load chamber; (iii) providing an extrusion tool comprising a first extrusion die, a second extrusion die, and a cooling cavity, wherein an extrusion transfer channel extends from the first extrusion die through the cooling cavity to the second extrusion die of the extrusion tool, wherein the portion of the extrusion transfer channel extending through the cooling cavity comprises at least one opening located between the first extrusion die and the second extrusion die, and wherein the cooling cavity comprises at least one cooling port configured to provide a cooling agent at the at least one opening of the extrusion transfer channel; (iv) providing a cooling agent through the at least one cooling port; (v) extruding the heated load carrier through the extrusion tool to provide an extruded product; (vi) providing a second load carrier made of the first metal material, wherein the second load carrier comprises a load end, a blind end, and at least one load chamber having a depth extending axially from the load end towards the blind end, wherein the at least one load chamber comprises a second load material, wherein the second load material is the extruded product formed in step v); (vii) heating the second load carrier to a temperature suitable for melting the second metal material in the extruded product and suitable for extruding the second load carrier; and (viii) extruding the second load carrier to provide a second extruded product.

In a further aspect, the present disclosure describes a method of dual-phase hot metal extrusion comprising the steps of: (i) providing a load carrier made of a first metal material, wherein the load carrier comprises a load end, a blind end, and at least one load chamber having a depth extending axially from the load end towards the blind end, wherein the at least one load chamber comprises a load material and a void space, wherein the load material comprises a second metal material, the second metal material having a lower melting point than the melting point of the first metal material, and wherein the void space is configured to accommodate at least a portion of the second metal material in its molten form when the load carrier is heated; (ii) heating the load carrier to a temperature above the melting point of the second metal material but below the melting point of the first metal material to form a solid load carrier comprising a liquid metal in the at least one load chamber; (iii) providing an extrusion tool comprising a first extrusion die, a second extrusion die, and a cooling cavity, wherein an extrusion transfer channel extends from the first extrusion die through the cooling cavity to the second extrusion die of the extrusion tool, wherein the portion of the extrusion transfer channel extending through the cooling cavity comprises at least one opening located between the first extrusion die and the second extrusion die, and wherein the cooling cavity comprises at least one cooling port configured to provide a cooling agent at the at least one opening of the extrusion transfer channel; (iv) providing a cooling agent through the at least one cooling port; and (v) continuously extruding the heated load carrier, wherein the load carrier is extruded through the first extrusion die, contacted with water, and extruded through the second extrusion die inside the container of an extrusion press.

In another aspect, the present disclosure describes an extruded composition comprising a primary metal or metal alloy and having a length, the extruded composition comprising filaments extending axially along at least a portion of the length of the extruded composition, wherein the filaments comprise a secondary metal or metal alloy and a cross-section of the extruded composition perpendicular to the length comprises at least 25 filaments.

In yet another aspect, the present disclosure describes an extruded composition comprising a primary metal or metal alloy and having a length, the extruded composition comprising filaments extending axially along at least a portion of the length of the extruded composition, wherein the filaments comprise a secondary metal or metal alloy and a cross-section of the extruded composition perpendicular to the length comprises at least 25 filaments, wherein at least one filament in the cross-section of the extruded composition has an average cross-sectional surface area of between about 1 nm$^2$ to about 10 cm$^2$.

In still another aspect, the present disclosure describes a copper extrusion product comprising filaments extending axially along at least a portion of the length of the copper extrusion product, wherein the filaments comprise aluminum, antimony, magnesium, tin, zinc, or any combination thereof, and a cross-section of the copper extrusion product perpendicular to the length comprises at least 25 filaments.

Other embodiments, objects, features, and advantages will be set forth in the detailed description of the embodiments that follow and, in part, will be apparent from the description or may be learned by practice of the claimed invention. These objects and advantages will be realized and attained by the compositions and methods described and claimed herein. The foregoing Summary has been made with the understanding that it is to be considered as a brief and general synopsis of some of the embodiments disclosed herein, is provided solely for the benefit and convenience of the reader, and is not intended to limit in any manner the scope, or range of equivalents, to which the appended claims are lawfully entitled.

DESCRIPTION

Figure 1:
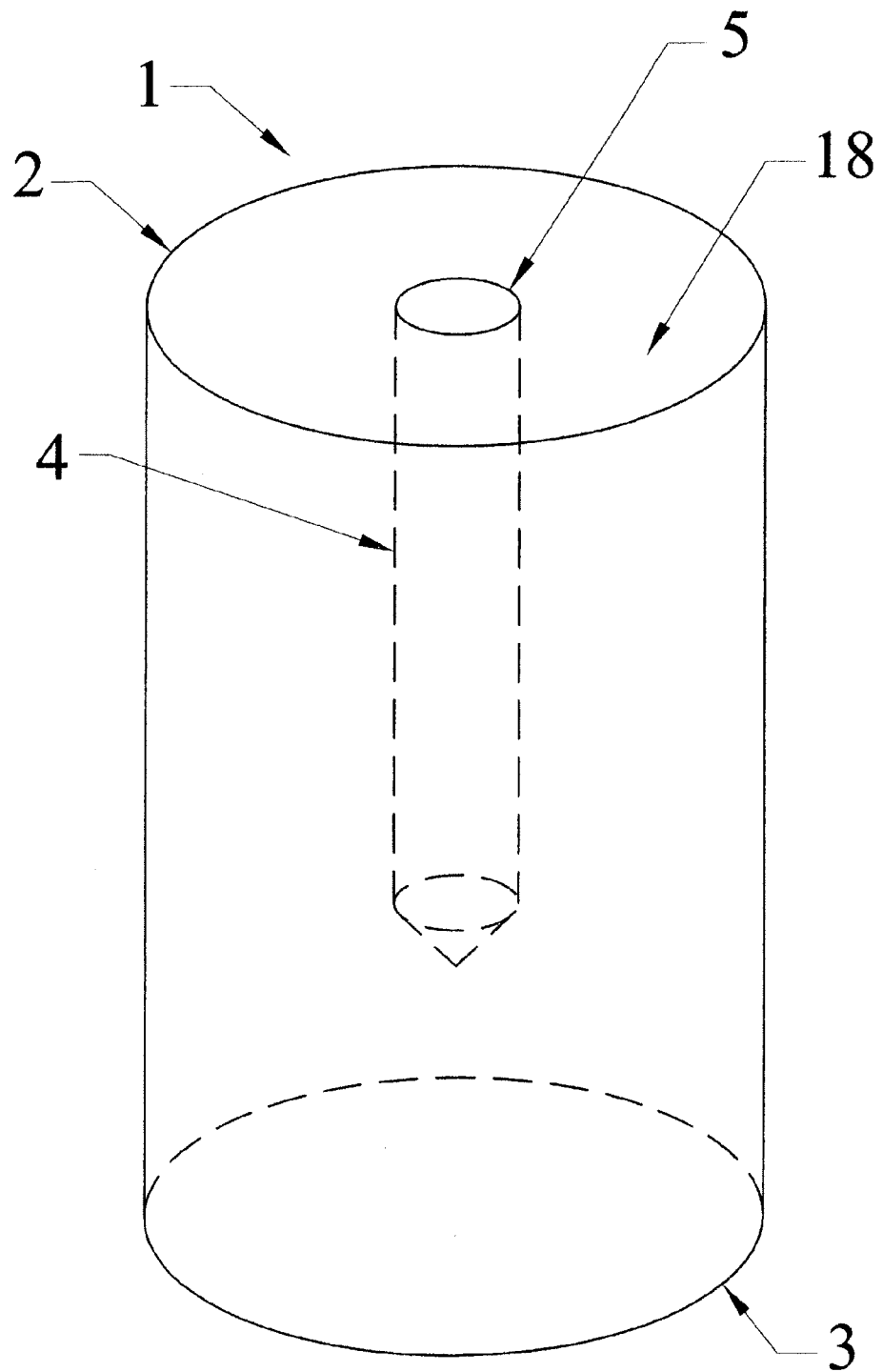
FIG. 1 is a cylindrical load carrier with a load chamber.

While the present disclosure is capable of being embodied in various forms, the description below of several embodiments is made with the understanding that the present disclosure is to be considered as an exemplification of the claimed subject matter, and is not intended to limit the appended claims to the specific embodiments illustrated and/or described. Accordingly, it should not be construed to limit the scope or breadth of the present invention. The headings used throughout this disclosure are provided for convenience only and are not to be construed to limit the claims in any way. Embodiments illustrated under any heading may be combined with embodiments illustrated under any other heading.

In one embodiment, the present disclosure provides a method for extruding a load carrier 1 made of a first metal material and containing a second metal material having a lower melting point than the first metal material, wherein the load carrier 1 is heated to a temperature at which the second metal material comprises a liquid metal and the load carrier 1 is extrudable, and the heated load carrier 1 containing the liquid metal is extruded to produce an extruded material. In another embodiment, the present disclosure provides a method for extruding a load carrier 1 made of a first metal material and containing a second metal material, wherein the load carrier 1 is heated to a temperature at which the first and second metal materials form an alloy having a melting point lower than the first metal material and the load carrier 1 is extrudable, and the heated load carrier 1 containing the alloy is extruded to produce an extruded material.

The load carrier 1 may be made of any desirable metal, including metals and metal alloys, that is extrudable. In one embodiment, the load carrier 1 may be made of copper or a copper alloy. In another embodiment, the load carrier 1 may be made of aluminum or an aluminum alloy. In yet another embodiment, the load carrier 1 may be made of brass. In another embodiment, the load carrier 1 may be made of lead or a lead alloy. In still another embodiment, the load carrier 1 may be made of tin or a tin alloy. In another embodiment, the load carrier 1 may be made of magnesium or a magnesium alloy. In another embodiment, the load carrier 1 may be made of zinc or a zinc alloy. In another embodiment, the load carrier 1 may be made of steel. In another embodiment, the load carrier 1 may be made of titanium or a titanium alloy. Other exemplary metals and metal alloys are known to those of ordinary skill in the art and would be understood to be within the scope of the present disclosure.

In one embodiment, the second metal material may comprise any desirable metal that is molten or that forms an alloy having a melting temperature lower than the extrusion temperature. Suitable metals include but are not limited to lithium, sodium, potassium, rubidium, cesium, beryllium, magnesium, calcium, strontium, barium, scandium, yttrium, lanthanum, titanium, zirconium, hafnium, vanadium, niobium, tantalum, chromium, manganese, technetium, rhenium, iron, ruthenium, osmium, cobalt, rhodium, iridium, nickel, palladium, platinum, copper, silver, gold, zinc, cadmium, aluminum, gallium, indium, thallium, silicon, germanium, tin, lead, antimony, bismuth, tellurium, cerium, praseodymium, neodymium, promethium, samarium, europium, gadolinium, terbium, dysprosium, holmium, erbium, thulium, ytterbium, lutetium, any combinations thereof, and any alloys thereof.

The load carrier 1 may be extruded at any suitable temperature. In one embodiment, the load carrier 1 may be extruded at a temperature ranging from about 30% to about 90% of the melting point of the load carrier 1. In another embodiment, the load carrier 1 may be extruded at a temperature ranging from about 40% to about 80% of the melting point of the load carrier 1. In yet another embodiment, the load carrier 1 may be extruded at a temperature ranging from about 50% to about 75% of the melting point of the load carrier 1. In other embodiments, the load carrier 1 may be extruded at a temperature ranging from about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, or about 90% of the melting point of the load carrier 1.

The load carrier 1 may be extruded in an extrusion press at any suitable pressure. In one embodiment, the load carrier 1 may be extruded in an extrusion press having a pressure of about 20 MPa to about 900 MPa. In another embodiment, the load carrier 1 may be extruded in an extrusion press having a pressure of about 35 MPa to about 800 MPa. In still another embodiment, the load carrier 1 may be extruded in an extrusion press having a pressure of about 50 MPa to about 700 MPa. In other embodiments, the load carrier 1 may be extruded in an extrusion press having a pressure of about 20 MPa, about 25 MPa, about 50 MPa, about 75 MPa, about 100 MPa, about 125 MPa, about 150 MPa, about 175 MPa, about 200 MPa, about 225 MPa, about 250 MPa, about 275 MPa, about 300 MPa, about 325 MPa, about 350 MPa, about 375 MPa, about 400 MPa, about 425 MPa, about 450 MPa, about 475 MPa, about 5000 MPa, about 525 MPa, about 550 MPa, about 575 MPa, about 600 MPa, about 625 MPa, about 650 MPa, about 675 MPa, about 700 MPa, about 725 MPa, about 750 MPa, about 775 MPa, about 800 MPa, about 825 MPa, about 850 MPa, about 875 MPa, about 900 MPa, or even higher.

The load carrier 1 may be extruded at any desirable ram speed. In one embodiment, the load carrier 1 may be extruded at a ram speed of about 0.0005 m/s to about 1 m/s. In another embodiment, the load carrier 1 may be extruded at a ram speed of about 0.01 m/s to about 0.75 m/s. In a further embodiment, the load carrier 1 may be extruded at a ram speed of about 0.1 m/s to about 0.50 m/s. In other embodiments, the load carrier 1 may be extruded at a ram speed of about 0.0005 m/s, about 0.001 m/s, about 0.0015 m/s, about 0.002 m/s, about 0.0025 m/s, about 0.003 m/s, about 0.0035 m/s, about 0.004 m/s, about 0.0045 m/s, about 0.005 m/s, about 0.0055 m/s, about 0.006 m/s, about 0.0065 m/s, about 0.007 m/s, about 0.0075 m/s, about 0.008 m/s, about 0.0085 m/s, about 0.009 m/s, about 0.0095 m/s, about 0.010 m/s, about 0.015 m/s, about 0.02 m/s, about 0.025 m/s, about 0.03 m/s, about 0.035 m/s, about 0.04 m/s, about 0.045 m/s, about 0.05 m/s, about 0.055 m/s, about 0.60 m/s, about 0.065 m/s, about 0.07 m/s, about 0.075 m/s, about 0.08 m/s, about 0.085 m/s, about 0.09 m/s, about 0.095 m/s, about 0.1 m/s, about 0.15 m/s, about 0.2 m/s, about 0.25 m/s, about 0.3 m/s, about 0.35 m/s, about 0.4 m/s, about 0.45 m/s, about 0.5 m/s, about 0.55 m/s, about 0.6 m/s, about 0.65 m/s, about 0.7 m/s, about 0.75 m/s, about 0.8 m/s, about 0.85 m/s, about 0.9 m/s, about 0.95 m/s, or about 1.0 m/s.

In another aspect, the present disclosure is further illustrated by reference to the pictorial embodiments of the aforementioned drawings. The drawings shall in no way be construed to be limiting. The present disclosure specifically contemplates other embodiments not illustrated but intended to be within the scope of the appended claims.

FIG. 1 depicts a load carrier 1 having a load end 2 and a blind end 3 with a load chamber 4 having a depth extending axially from the top surface 18 of the load end 2 towards the blind end 3 of the load carrier. As used herein, the term "load carrier" refers to any metallic container, including but not limited to castings and fabrications, that holds the load material during the dual-phase hot extrusion process. The load carrier 1 comprises an inlet 5 through the top surface 18 of the load end 2 that provides an opening into the load chamber 4. Although the load carrier 1 is depicted as cylindrical, the load carrier 1 may be any desired shape suitable for extrusion. Similarly, the shape of the inlet 5 of the load chamber 4 may be any desirable shape.

The depth of a load chamber 4 may be any desired depth. In one embodiment, the depth of a load chamber 4 may be from about 10% to about 95% of the length of the load carrier 1. In another embodiment, the depth of a load chamber 4 may be from about 15% to about 90% of the length of the load carrier 1. In yet another embodiment, the depth of a load chamber 4 may be from about 20% to about 85% of the length of the load carrier 1. In still another embodiment, the depth of a load chamber 4 may be from about 25% to about 80% of the length of the load carrier 1. In a further embodiment, the depth of a load chamber 4 may be from about 30% to about 75% of the length of the load carrier 1. In yet a further embodiment, the depth of a load chamber 4 may be from about 35% to about 70% of the length of the load carrier 1. In other embodiments, the depth of a load chamber 4 may be about 10%, 13%, 15%, 17%, 20%, 23%, 25%, 27%, 30%, 33%, 35%, 37%, 40%, 43%, 45% 47%, 50%, 53%, 55%, 57%, 60%, 63%, 65%, 67%, 70%, 73%, 75%, 77%, 80%, 83%, 85%, 87%, 90%, 93%, or 95% of the length of the load carrier 1.

Figure 2A:
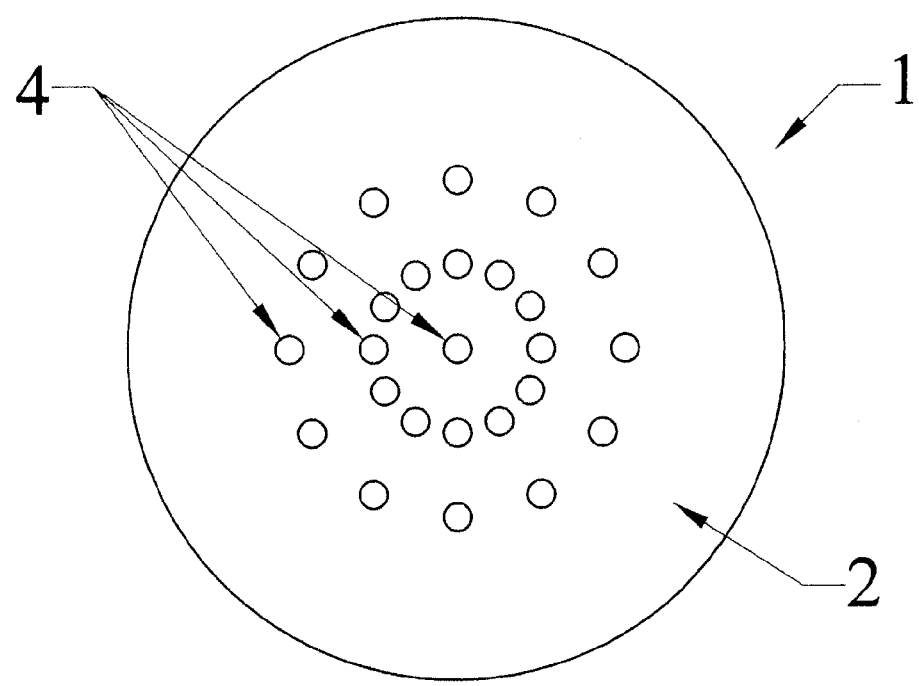
FIG. 2A is a top-view of the load end of a load carrier containing a configuration of twenty-five load chambers.
Figure 2B:
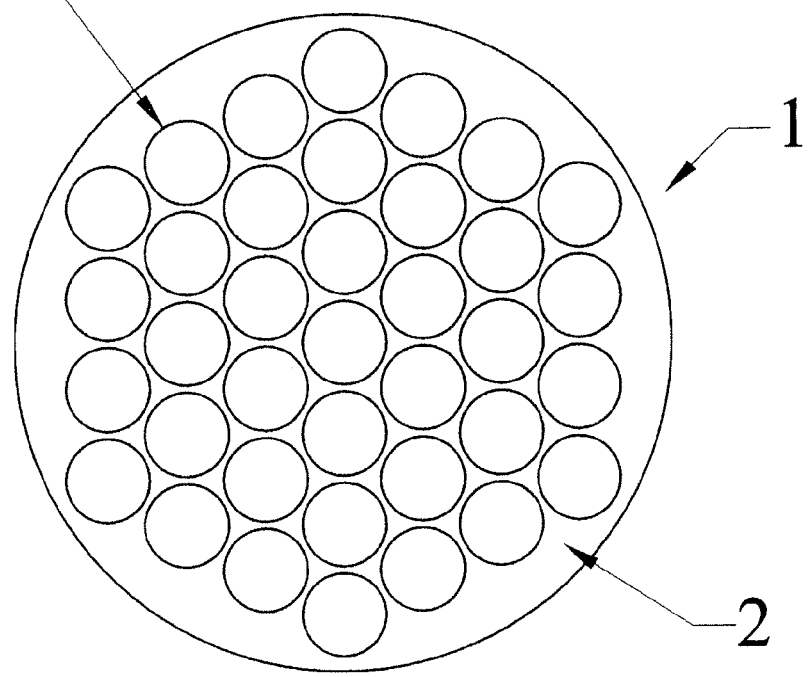
FIG. 2B is a top-view of the load end of a load carrier containing a staggered configuration of thirty-seven load chambers.

FIG. 2A is a top-view of the load end 2 of a cylindrical load carrier 1 comprising a central load chamber 4 surrounded by a first ring of twelve load chambers 4 radially spaced at 30° apart and a second ring of twelve load chambers 4 also radially spaced at 30° apart. FIG. 2B is a top-view of the load end 2 of a cylindrical load carrier 1 comprising thirty-seven load chambers 4 arranged in a hexagonal configuration. As is evident from FIGS. 2A and 2B, the size and pattern of the load chambers may be any desired size and pattern.

The load carrier 1 may comprise from one load chamber to about 500 load chambers. In another embodiment, the load carrier 1 may comprise from one load chamber to about 400 load chambers. In yet another embodiment, the load carrier 1 may comprise from one load chamber to about 300 load chambers. In a further embodiment, the load carrier 1 may comprise from one load chamber to about 200 load chambers. In still another embodiment, the load carrier 1 may comprise from one load chambers to about 100 load chambers. In one embodiment, the load carrier 1 may comprise from about 5 load chambers to about 95 load chambers. In another embodiment, the load carrier 1 may comprise from about 10 load chambers to about 90 load chambers. In another embodiment, the load carrier 1 may comprise from about 15 load chambers to about 85 load chambers. In still another embodiment, the load carrier 1 may comprise from about 20 load chambers to about 80 load chambers. In a further embodiment, the load carrier 1 may comprise from about 25 load chambers to about 75 load chambers. In other embodiments, the load carrier 1 may comprise 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 load chambers.

In embodiments wherein the load carrier 1 comprises multiple load chambers 4, the depths of the multiple load chambers 4 may be the same or different. In one embodiment, the multiple load chambers 4 may be disposed at a single depth. In another embodiment, the multiple load chambers 4 may be disposed at two different depths. In yet another embodiment, the multiple load chambers 4 may be disposed at three different depths. In still another embodiment, the multiple load chambers 4 may be disposed at four different depths. In a further embodiment, the multiple load chambers 4 may be disposed at five different depths. In other embodiments, the multiple load chambers 4 may be disposed at 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 different depths.

The depth of any load chamber 4 may be any suitable depth. In one embodiment, the depth of any load chamber 4 may be from about 10% to about 90% of the length of the load carrier 1, wherein the length of the load carrier 1 is the distance between the top surface 2 and blind end 3 of the load carrier 1. In a further embodiment, the depth of any load chamber 4 may be from about 20% to about 80% of the length of the load carrier 1. In another embodiment, the depth of any load chamber 4 may be from about 30% to about 70% of the length of the load carrier 1. In still a further embodiment, the depth of any load chamber 4 may be from about 40% to about 60% of the length of the load carrier 1. In other embodiments, the depth of any load chamber 4 may be about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, or about 90% of the length of the load carrier 1.

Figure 3A:
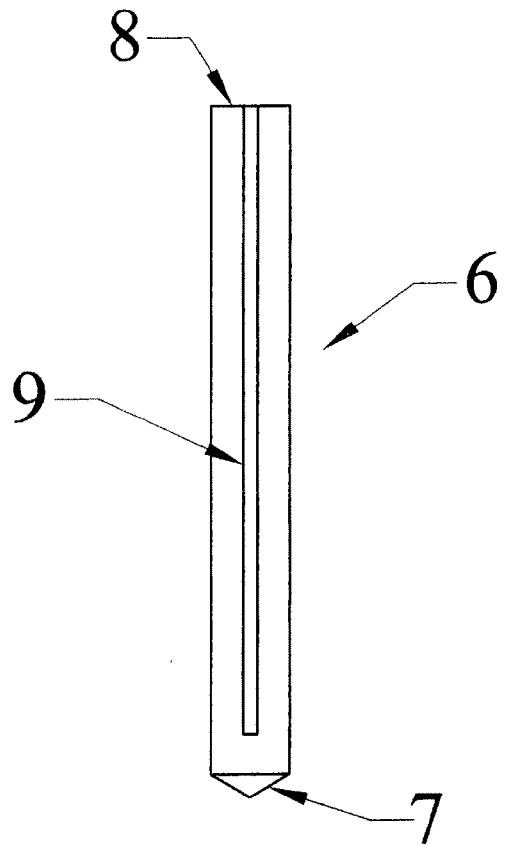
FIG. 3A is a side-view of a fluted spacer.
Figure 3B:
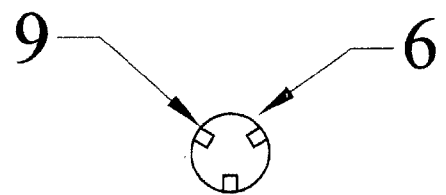
FIG. 3B is a top-view of a fluted spacer.

FIG. 3A is a side-view of a spacer 6 having a bottom end 7 and a top end 8. A flute 9 extends axially from the top end 8 towards the bottom end 7 of the spacer 6. The flute 9 extends for a portion of the length of the spacer 6. FIG. 3B is a top-view of the top end 8 of the spacer 6 showing three flutes 9 located on the outside perimeter of the spacer 6. Although the cylindrical spacer 6 depicted in FIG. 3B comprises three flutes 9, any number of flutes may be used in accordance with the present disclosure. In one embodiment, the spacer 6 may contain one flute. In another embodiment, the spacer 6 may contain two flutes. In yet another embodiment, the spacer 6 may contain three flutes. In a further embodiment, the spacer 6 may contain four flutes. In still other embodiments, the spacer 6 may contain 5, 6, 7, 8, 9, 10, 11, 12, 13, 14, 15, 16, 17, or 18 flutes. In another embodiment, the spacer 6 may be non-fluted (i.e., comprising no flutes).

A spacer 6 may be made of any material or composition suitable for hot metal extrusion. Generally, the spacer material should be the same or a similar composition as and should be compatible with the load carrier material. In one embodiment, the load carrier 1 and spacers 6 are made of a metal comprising copper. In another embodiment, the load carrier 1 and spacers 6 are made of a metal comprising aluminum. In yet another embodiment, the load carrier 1 and spacers 6 are made of a metal comprising brass. In a further embodiment, the load carrier 1 and spacers 6 are made of a metal comprising lead. In still a further embodiment, the load carrier 1 and spacers 6 are made of a metal comprising tin. In one embodiment, the load carrier 1 and spacers 6 are made of a metal comprising magnesium. In another embodiment, the load carrier 1 and spacers 6 are made of a metal comprising zinc. In still another embodiment, the load carrier 1 and spacers 6 are made of a metal comprising steel. In a further embodiment, the load carrier 1 and spacers 6 are made of a metal comprising titanium.

Figure 4:
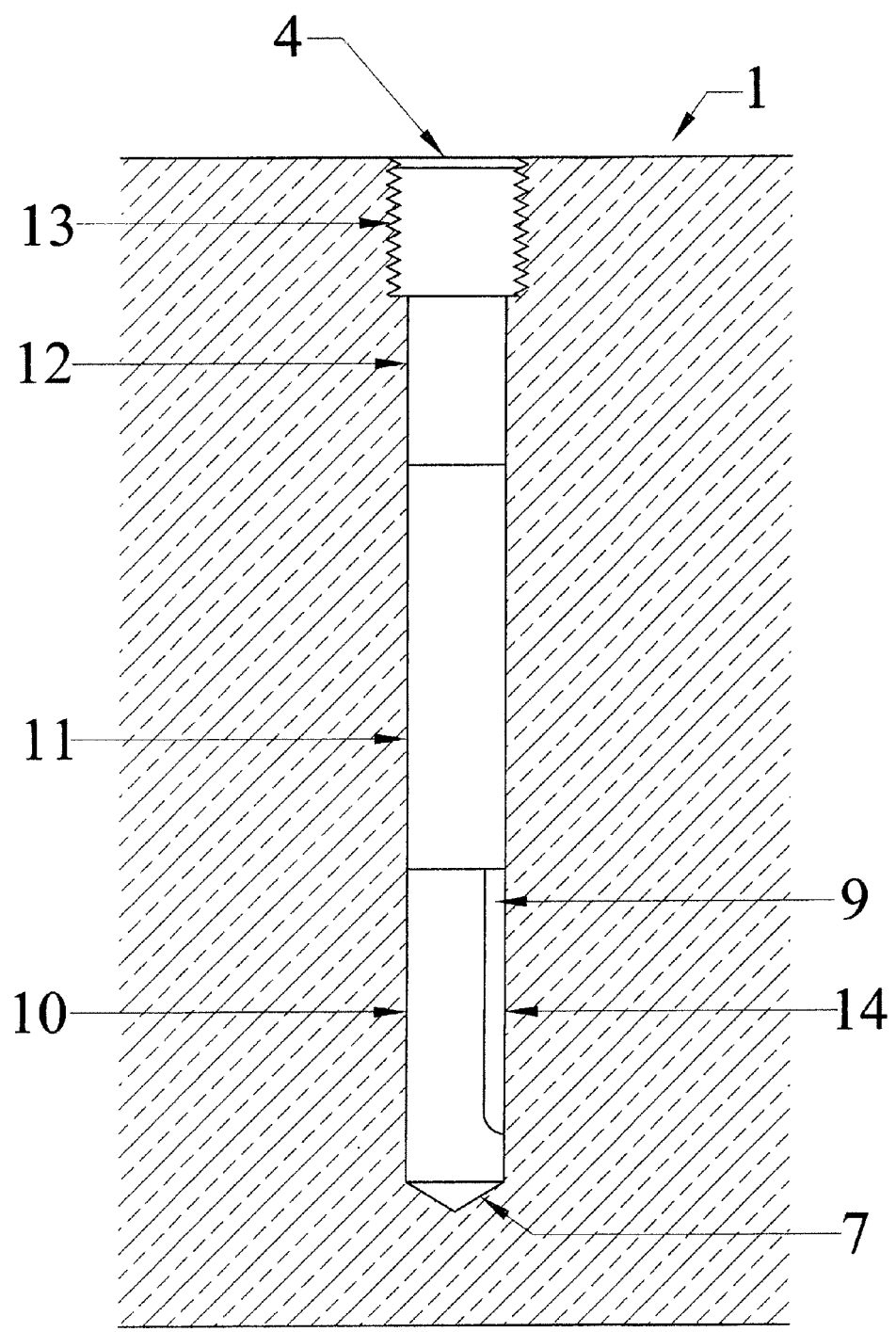
FIG. 4 is a cross-sectional view along the primary axis of a load carrier comprising a load chamber loaded with a fluted spacer, a load material, a non-fluted spacer, and a plug.

FIG. 4 is a cross-sectional view of a load chamber 4 along the length of a load carrier 1 comprising a fluted spacer 10, a load material 11, a non-fluted spacer 12, and a plug 13. The bottom end 7 of the fluted spacer 10 is shaped to fit the load chamber such that no air or other gas pockets are formed between the fluted spacer 10 and the load chamber 4 except for the void space 14 formed by the flute 9 and the wall of the load chamber 4.

The total volume of void space 14 provided by a fluted spacer 9 may be sufficient to accommodate at least a portion of the increased volume of the load material 11 caused by thermal expansion when heated to the extrusion temperature ($\Delta V = V_{T(extrusion)} - V_{Ti}$). In one embodiment, $\Delta V$ of the load material may be from about 1% to about 100% of the initial volume of the load material. In another embodiment, $\Delta V$ of the load material may be from about 5% to about 90% of the initial volume of the load material. In still another embodiment, $\Delta V$ of the load material may be from about 10% to about 80% of the initial volume of the load material. In yet another embodiment, $\Delta V$ of the load material may be from about 15% to about 70% of the initial volume of the load material. In a further embodiment, $\Delta V$ of the load material may be from about 20% to about 60% of the initial volume of the load material. In still other embodiments, $\Delta V$ of the load material may be about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or about 100% of the initial volume of the load material.

Although the void space 14 shown in FIG. 4 is provided by a fluted spacer, the void space may be provided by any other suitable means. For example, the load chamber 4 may be milled to contain a void space, which is in contact with the load material upon heating or the void space may be provided by a hollowed, non-fluted spacer.

Figure 5:
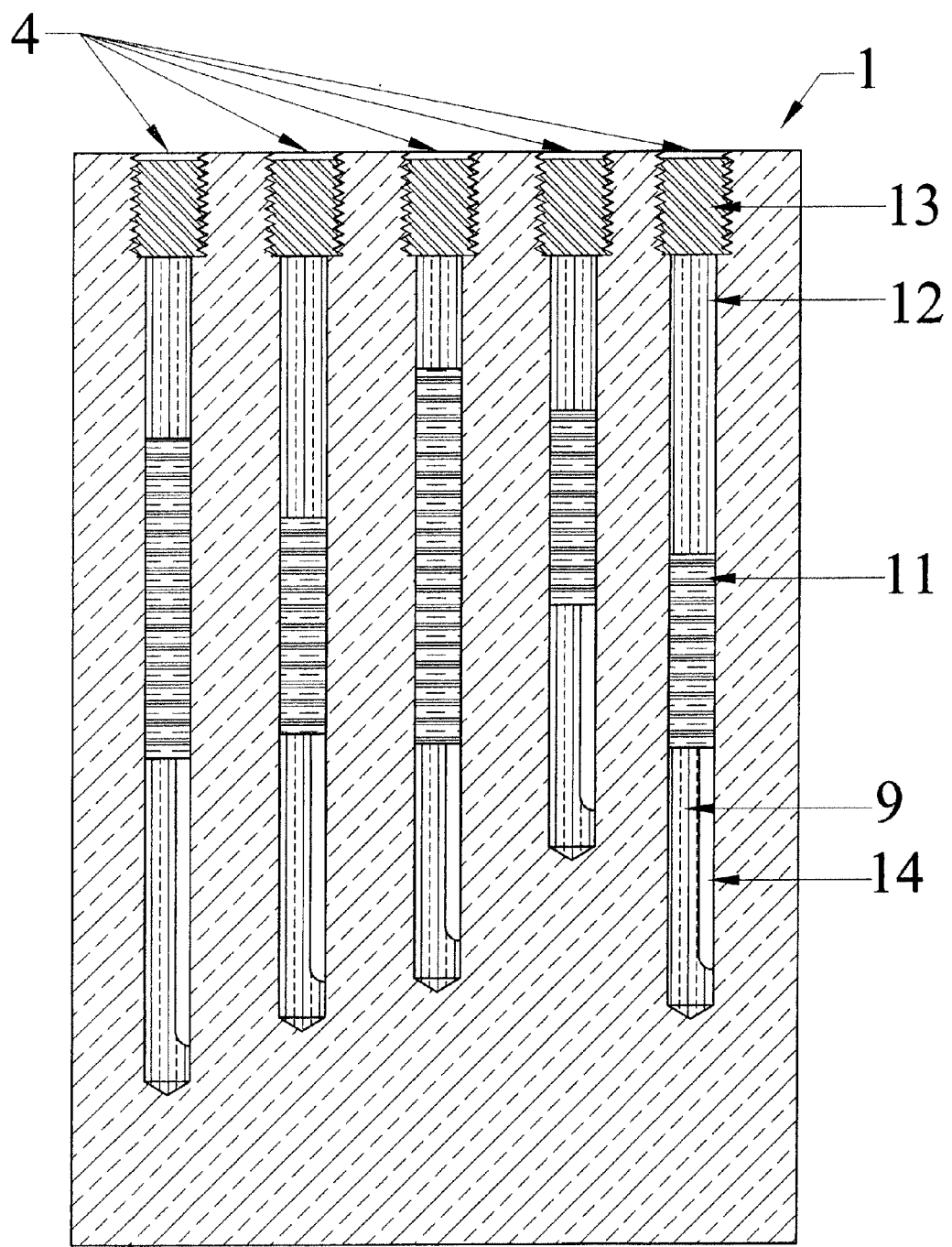
FIG. 5 is a cross-sectional view along the primary axis of a load carrier comprising five load chambers, each load chamber loaded with a fluted spacer, a load material, a non-fluted spacer, and a plug.

FIG. 5 is a cross-sectional view of a load carrier 1 comprising five load chambers 4. Each load chamber 4 comprises a fluted spacer 10, a load material 11, a non-fluted spacer 12, and a plug 13. Each load chamber 4 extends from the top surface 2 towards the bottom surface 3 to a different depth and contains a void space 14 formed by the flute 9 of the fluted spacer 10 and the wall of the load chamber 4. The plug 13 can be any suitable plug sufficient to secure the load material 11 within the load chamber 4 during the hot extrusion process. In one embodiment, the plug 13 may be a set screw. In another embodiment, the plug 13 may be a pipe plug. In yet another embodiment, the plug 13 may by a tapered plug. In still another embodiment, the plug 13 may be a tapered plug. In still another embodiment, the plug 13, may be a welded plug. In a further embodiment, the plug 13 may be a swaged plug. In still a further embodiment, the plug 13 may be a brazed plug.

In another aspect, the present disclosure provides a method of dual-phase hot metal extrusion comprising (i) providing a first load carrier 1 made of a first metal material and containing in one or more load chambers 4 a second metal material having a lower melting point than the first metal material, (ii) heating the first load carrier 1 to a temperature at which the second metal material comprises a liquid metal and the first load carrier 1 is extrudable, (iii) extruding the first load carrier 1 containing the liquid metal to produce a first extruded product, (iv) providing a second load carrier 15 made of the same or a different metal material as the first load carrier comprising one or more load chambers 4, (v) securing a portion of the first extruded product in the one or more load chambers 4, (vi) heating the second load carrier to a temperature at which the second metal material in the first extruded product comprises a liquid metal and the second load carrier 15 is extrudable, and (vii) extruding the second load carrier 15 to form a second extruded product.

In one embodiment, both the first load carrier 1 and second load carrier 15 are extruded through flow extrusion dies. This process provides an efficient method for incorporating numerous filaments of the second metal material through at least a portion of the length of the second extruded product. In one embodiment, about 20 filaments to about 2,000 filaments of the second metal material extend axially along at least a portion of the length of the second extruded product. In another embodiment, about 25 to about 1,500 filaments of the second metal material extend axially along at least a portion of the length of the second extruded product. In a further embodiment, about 30 to about 1,000 filaments of the second metal material extend axially along at least a portion of the length of the second extruded product. As used herein, "extend axially" means to extend in the same general direction as the length of the extruded product and does not mean to extend perfectly parallel to the length of the extruded product. Accordingly, the term "extend axially" permits local deviation in the axial direction of the filament so long as the filament generally extends along at least a portion of the length of the extruded product. For example, a filament or portion of a filament extending axially along the length of an extrusion product or a load chamber extending axially along the length of a load carrier may be oriented at an angle that is about 1°, about 2°, about 3°, about 4°, about 5°, about 6°, about 7°, about 8°, about 9°, about 10°, about 11°, about 12°, about 13°, about 14°, about 15°, about 16°, about 17°, about 18°, about 19°, about 20°, about 21°, about 23°, about 24°, about 25°, about 26°, about 27°, about 28°, about 29°, about 30°, about 31°, about 32°, about 33°, about 34°, about 35°, about 36°, about 37°, about 38°, about 39°, about 40°, about 41°, about 42°, about 43°, about 44°, or about 45° relative to the axis along the length of extrusion product or load carrier.

In one embodiment, the second extruded product may comprise at least 500 filaments of the second metal material. In another embodiment, the second extruded product may comprise at least 1,000 filaments of the second metal material. In still another embodiment, the second extruded product may comprise at least 1,500 filaments of the second metal material. For example, a second extruded product containing 925 filaments of a second metal material can be produced using a first load carrier 1 comprising twenty-five load chambers 4 and a second load carrier 15 comprising thirty-seven load chambers. Similarly, a second extruded product containing 1,369 filaments of a second metal material can be produced using a first load carrier 1 comprising thirty-seven load chambers 4 and second load carrier 15 comprising thirty-seven load chambers.

In other embodiments, the second extruded product may comprise at least 25, at least 50, at least 75, at least 100, at least 150, at least 200, at least 250, at least 300, at least 350, at least 400, at least 450, at least 500, at least 550, at least 600, at least 650, at least 700, at least 750, at least 800, at least 850, at least 900, at least 950, at least 1000, at least 1050, at least 1100, at least 1150, at least 1200, at least 1250, at least 1300, at least 1350, at least 1400, at least 1450, at least 1500, at least 1650, at least 1700, at least 1750, at least 1800, at least 1850, at least 1900, at least 1950, at least 2000, at least 2050, at least 2100, at least 2150, at least 2200, at least 2250, at least 2300, at least 2350, at least 2400, at least 2450, at least 2500, at least 2650, at least 2700, at least 2750, at least 2800, at least 2850, at least 2900, at least 2950, or at least 3,000 filaments of the second metal material.

In another embodiment, this process may be iterated any desired number of times to produce an extruded product containing from about 1,000 to about 10,000 million filaments of the second metal material. In one embodiment, an extruded product may comprise from about 2,000 to about 1 million filaments of the second metal material. In another embodiment, an extruded product may comprise from about 5,000 to about 500,000 filaments of the second metal material. In yet a further embodiment, an extruded product may comprise from about 10,000 to about 250,000 filaments. In other embodiments, an extruded product may comprise at least 1,000, at least 2,500, at least 5,000, at least 7,500, at least 10,000, at least 15,000, at least 25,000, at least 50,000, at least 75,000, at least 150,000, at least 250,000, at least 500,000, at least 750,000, at least 1 million, at least 1.25 million, at least 1.5 million, at least 1.75 million, at least 2 million, at least 2.5 million, at least 3 million, at least 3.5 million, at least 4 million, at least 4.5 million, at least 5 million, at least 5.5 million, at least 6 million, at least 6.5 million, at least 7 million, at least 7.5 million, at least 8 million, at least 9 million, or at least 10 million filaments of the second metal material.

In one embodiment, a cross-section of an extruded composition may comprise filaments having an average surface area per filament from about 1 $nm^2$ to about 10 $cm^2$. In another embodiment, a cross-section of an extruded composition may comprise filaments having an average surface area per filament from about 1 $\mu m^2$ to about 1 $cm^2$. In yet another embodiment, a cross-section of an extruded composition may comprise filaments having an average surface area per filament from about 1 $mm^2$ to about 0.5 $cm^2$. In still another embodiment, a cross-section of an extruded composition may comprise filaments having an average surface area per filament of between about 1 $nm^2$ and 1 $\mu m^2$. In a further embodiment, a cross-section of an extruded composition may comprise filaments having an average surface area per filament of between about 1 $\mu m^2$ to about 1 $mm^2$. In still a further embodiment, a cross-section of an extruded composition may comprise filaments having an average surface area per filament of between about 1 $mm^2$ to about 1 $cm^2$. In another embodiment, a cross-section of an extruded composition may comprise filaments having an average surface area per filament of between about 1 $cm^2$ to about 10 $cm^2$. In still other embodiments, a cross-section of an extruded composition may comprise filaments having an average surface area per filament of at least 1 nm², at least 10 nm², at least 100 nm², at least 1000 nm², at least 1 μm², at least 4 μm², at least 9 μm², at least 16 μm², at least 25 μm², at least 36 μm², at least 49 μm², at least 64 μm², at least 81 μm², at least 100 μm², at least 1000 μm², at least 1 mm², at least 4 mm², at least 9 mm², at least 16 mm², at least 25 mm², at least 36 mm², at least 49 mm², at least 64 mm², at least 81 mm², at least 100 mm², at least 1000 mm², at least 0.001 cm², at least 0.01 cm², at least 0.1 cm², at least 1 cm², at least 2 cm², at least 4 cm², at least 9 cm², or at least 10 cm².

In a further embodiment, the first load carrier 1 is extruded through a flow extrusion die and the second load carrier 15 is extruded through a shear extrusion die. In this process, the load material is randomly dispersed in at least a portion of the second extrusion product. In other embodiments, the second extrusion product containing randomly dispersed load material may be re-extruded through a shear extrusion die any number of times to further randomly disperse the load material throughout the extrusion product.

In another aspect, the present disclosure provides a method of dual-phase hot metal extrusion comprising (i) providing a first load carrier 1 made of a first metal material and containing in one or more load chambers 4 a second metal material having a lower melting point than the first metal material, (ii) heating the first load carrier 1 to a temperature at which the first and second metal materials form a liquid alloy and the first load carrier 1 is extrudable, (iii) extruding the first load carrier 1 containing the liquid alloy to produce a first extruded product, (iv) providing a second load carrier 15 made of the same or a different metal material as the first load carrier comprising one or more load chambers 4, (v) securing a portion of the first extruded product in the one or more load chambers 4, (vi) heating the second load carrier to a temperature at which the first and second metal materials in the first extruded product form a liquid alloy and the second load carrier 15 is extrudable, and (vii) extruding the second load carrier 15 to form a second extruded product.

Figure 6:
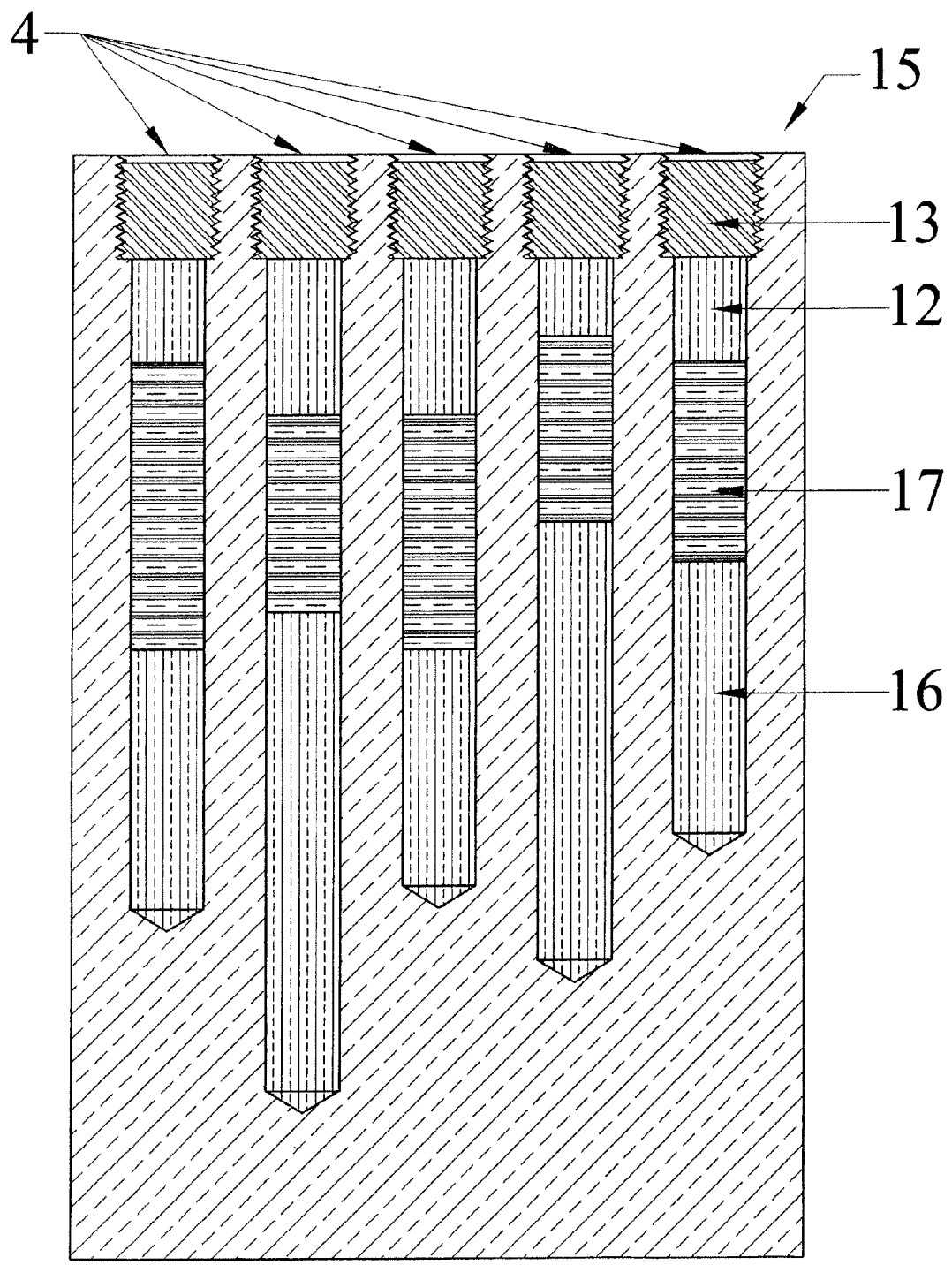
FIG. 6 is a cross-sectional view along the primary axis of a load carrier comprising a load chamber loaded with a load material disposed between two non-fluted spacers and a plug.

FIG. 6 is a cross-sectional view of a load carrier 15 having a load chamber 4 comprising a first non-fluted spacer 16, a load material 17 wherein the load material 17 is a product previously extruded in accordance with the disclosure herein, a second non-fluted spacer 12, and a plug 13.

In another aspect, the present disclosure provides tooling useful for dual-phase hot metal extrusion processes. In general, an extrusion tool is provided comprising a first extrusion die, a second extrusion die, and a cooling cavity. This extrusion tool is further illustrated by reference to non-limiting FIG. 7.

Figure 7:
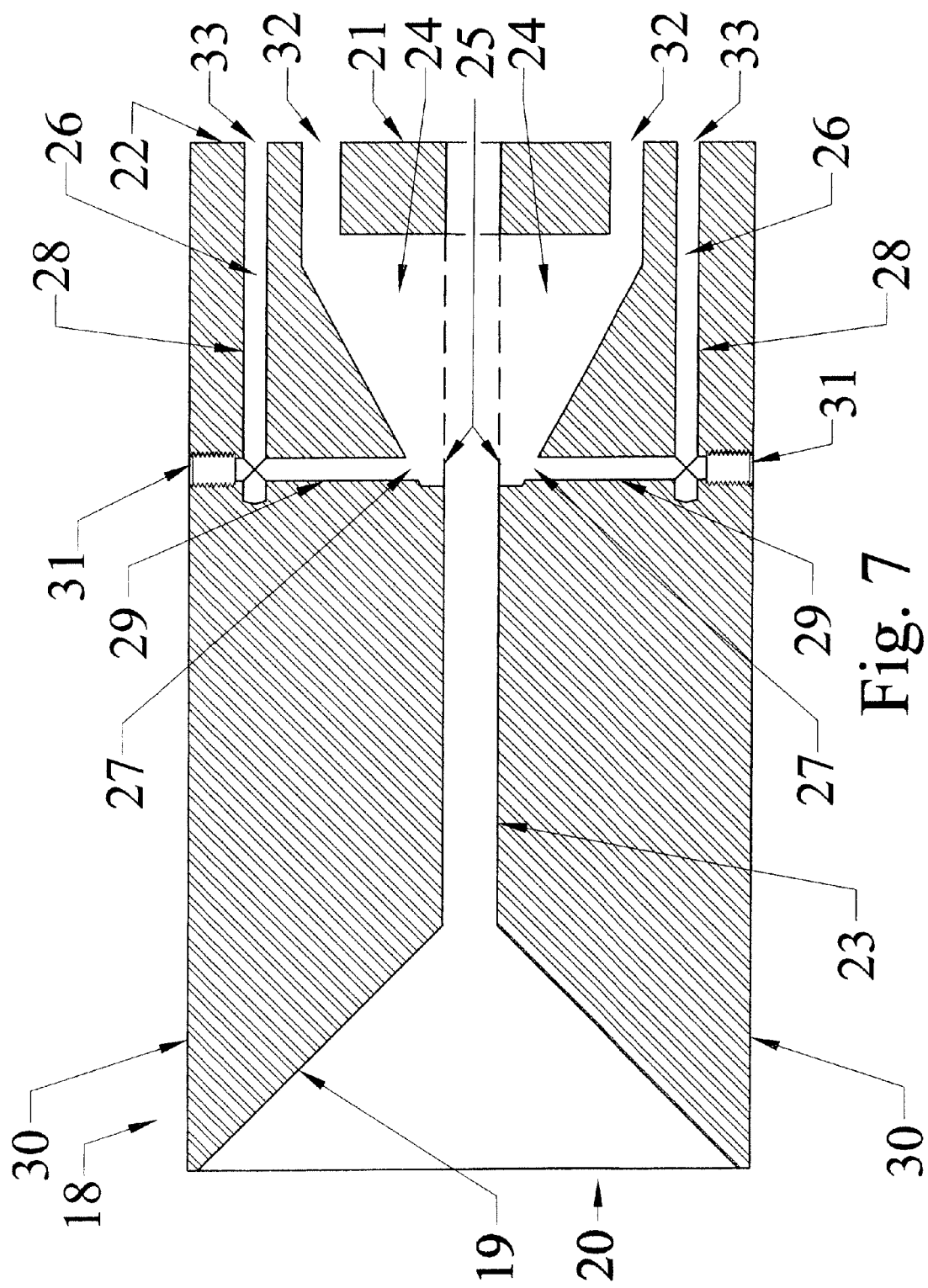
FIG. 7 is a cross-sectional view of a cylindrical extrusion tool as disclosed herein.

FIG. 7 is a cross-sectional view along the primary axis of a cylindrical extrusion tool 18 comprising a first extrusion die 19 at the front end 20 of the extrusion tool 18 and a second extrusion die 21 at the back end 22 of the extrusion tool 18. The first extrusion die 19 is connected to the second extrusion die 21 by an extrusion transfer channel 23 extending the length of the extrusion tool 18 from the first extrusion die 19 to the second extrusion die 21. Cooling cavities 24 extend from the back end 22 of the extrusion tool 18 towards the front end 20 for a portion of the length of the extrusion tool 18 and beyond the second extrusion die 21. In this configuration, a portion of the extrusion transfer channel 23 is adjacent to the cooling cavities 24. The portion of the extrusion transfer channel 23 adjacent to the cooling cavities 24 comprises at least one opening 25 to each of the cooling cavities 24, thereby exposing the inside of the extrusion transfer channel 23 to the cooling cavities 24. The at least one opening 25 to each of the cooling cavities 24 may be any suitable shape such as, but not limited to, a square, rectangle, circle, triangle, and the like.

The portion of the extrusion transfer channel 23 adjacent to the cooling cavities 24 may comprise any desired number of openings 25 to each of the cooling cavities 24. In one embodiment, the portion of the extrusion transfer channel 23 adjacent to the cooling cavities 24 may comprise one opening 25 to each of the cooling cavities 24. In another embodiment, the portion of the extrusion transfer channel 23 adjacent the cooling cavities 24 may comprise two openings 25 to each of the cooling cavities 24. In yet another embodiment, the portion of the extrusion transfer channel 23 adjacent to the cooling cavities 24 may comprise three openings 25 to each of the cooling cavities 24. In still other embodiments, the portion of the extrusion transfer channel 23 adjacent to the cooling cavities 24 may comprise at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 40, 41, 42, 43, 44, 45, 46, 47, 48, 49, or 50 openings 25 to each of the cooling cavities 24.

Although FIG. 7 depicts an extrusion tool 18 comprising two cooling cavities 24, any suitable number of cooling cavities 24 may be used. In one embodiment, the extrusion tool 18 may comprise one cooling cavity 24. In another embodiment, the extrusion tool 18 may comprise two cooling cavities 24. In yet another embodiment, the extrusion tool 18 may comprise three cooling cavities 24. In still another embodiment, the extrusion tool 18 may comprise four cooling cavities 24. In other embodiments, the extrusion tool 18 may comprise at least 1, at least 2, at least 3, at least 4, at least 5, at least 6, at least 7, at least 8, at least 9, at least 10, at least 11, at least 12, at least 13, at least 14, at least 15, or at least 16 cooling cavities 24.

The extrusion tool 18 further comprises cooling agent channels 26 extending from the back end 22 of the extrusion tool 18 for a portion of the length of the extrusion tool 18. Any suitable number of cooling agent channels 26 may be used. For example, the extrusion tool 18 may comprise 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 cooling agent channels 26, depending on the number of cooling cavities 24 and the size of the extrusion tool 18.

The cooling agent channels 26 are attached to a cooling agent source. In one embodiment, the cooling agent may be water. In another embodiment, the cooling agent may be an oil. In yet another embodiment, the cooling agent may be an inert gas such as carbon dioxide, nitrogen, argon, and the like. In a further embodiment, the cooling agent may be a reactive gas chosen to form desirable compounds with the metal of the extrusion product. The cooling agent channels 26 open into the front end of the cooling cavities 24 through cooling ports 27, which are configured such that the cooling agent comes into contact with the one or more openings 25 in the extrusion transfer channel 23. In this configuration, as the first extruded product is extruded through the first extrusion die 19 and enters the portion of the extrusion transfer channel 23 adjacent to the cooling cavities 24, the cooling agent running through the cooling channels 26 and through the cooling ports 27 comes into contact with the first extruded product through the openings 25 in the extrusion transfer channel 23, thereby cooling the first extruded product. In one embodiment, the first extruded product may be cooled to a temperature below the melting point of the second metal material before being extruded through the second extrusion die 21.

The cooling agent channels 26 are formed by drilling first channels 28 along the primary axis of the extrusion tool 18 from the back end 22 of the extrusion tool 18 towards the front end 20 of the extrusion tool 18 and bisecting second channels 29 perpendicular to the primary axis of the extrusion tool 18 from the outside perimeter 30 of the extrusion tool 18 into the cooling cavities 24. The end of the second channels 29 along the outside perimeter of the extrusion tool 18 are sealed with plugs 31. In one embodiment, the plug 31 may be a set screw. In another embodiment, the plug 31 may be a pipe plug. In yet another embodiment, the plug 31 may by a tapered plug. In still another embodiment, the plug 31, may be a welded plug. In a further embodiment, the plug 31 may be a swaged plug. In still a further embodiment, the plug 31 may be a brazed plug.

In the embodiment according to FIG. 7, the cooling cavities 24 are shaped to accommodate the volume expansion of the cooling agent (e.g., water) when it comes into contact with the hot first extruded product. Each cooling cavity 24 further comprises an exit port 32, which permits the release of excess pressure build-up as the cooling agent is heated by contact with the first extruded product.

Figure 8:
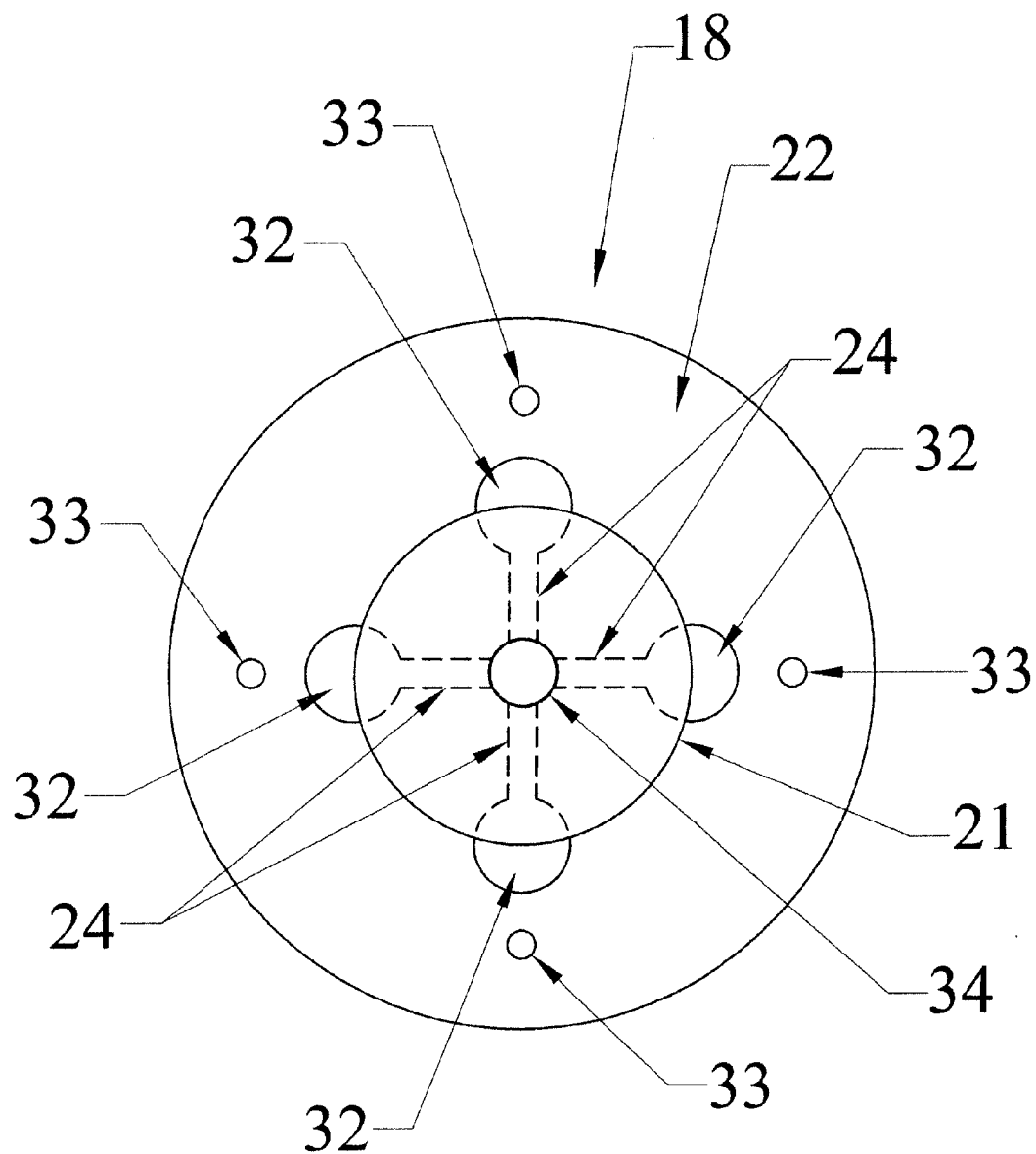
FIG. 8 is an end view of the back end of a cylindrical extrusion tool as disclosed herein.

FIG. 8 is an end-view of the back end 22 of the cylindrical extrusion tool 18. The back end 22 of the extrusion tool 18 comprises the second extrusion die 21 and four exit ports 32 connected to four cooling cavities 24. The back end 22 further comprises four inlets 33 to the cooling agent channels 26, which are connected to the four cooling cavities 24. The second extrusion die 21 comprises an extrusion exit 34.

Figure 9A:
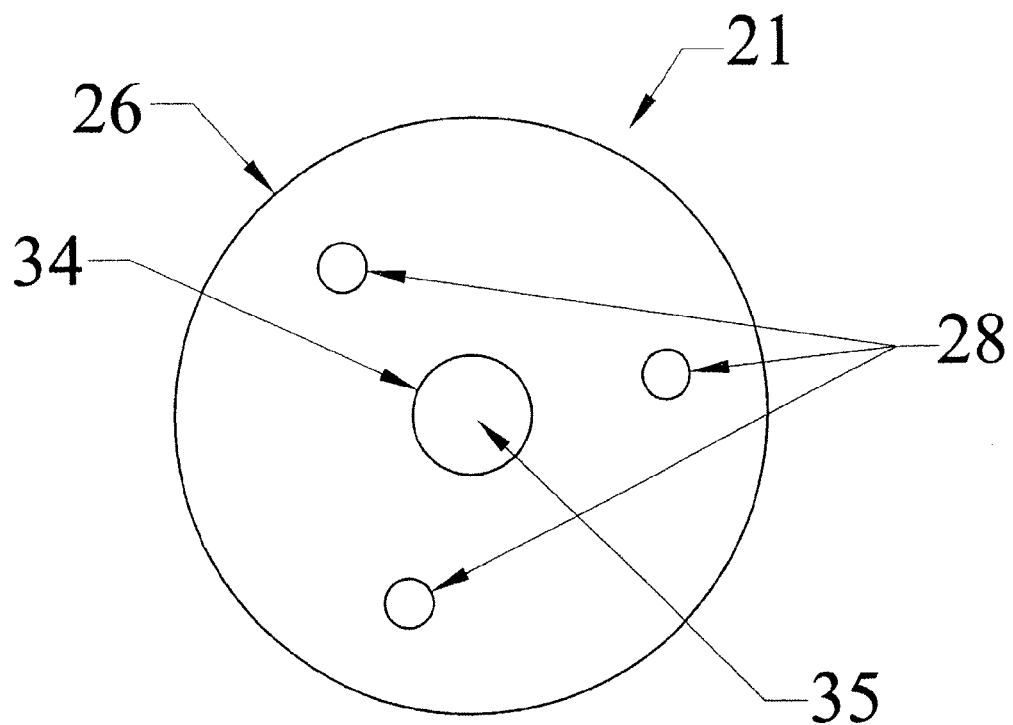
FIG. 9A is an end view of the second extrusion die of an extrusion tool as disclosed herein.
Figure 9B:
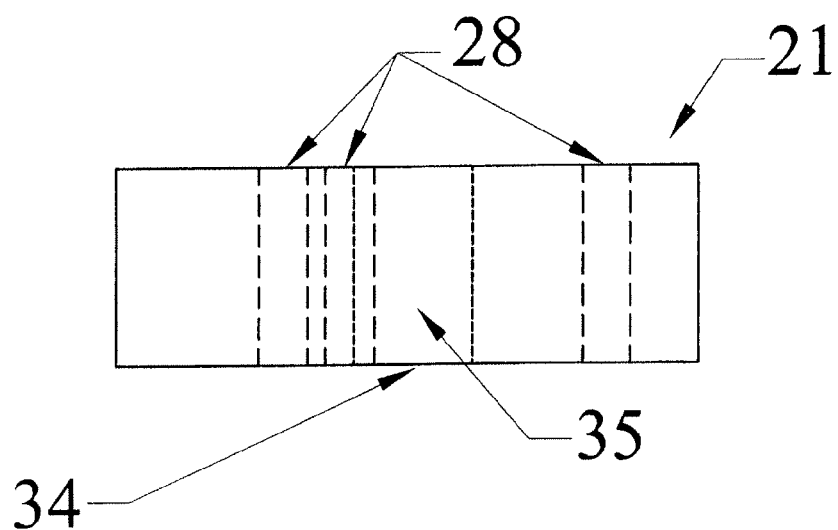
FIG. 9B is a side view of the second extrusion die of FIG. 9A.

FIG. 9A is an end-view of the second extrusion die 21 comprising an extrusion exit 34 and a die extrusion channel 35. The second extrusion die 21 may optionally comprise one or more jacking bolts 28 to facilitate the removal of the second extrusion die 21 from the extrusion tool 18 for maintenance. FIG. 9B is a side view of the second extrusion die 21 comprising a die extrusion channel 35 and an extrusion exit 34.

Figure 10A:
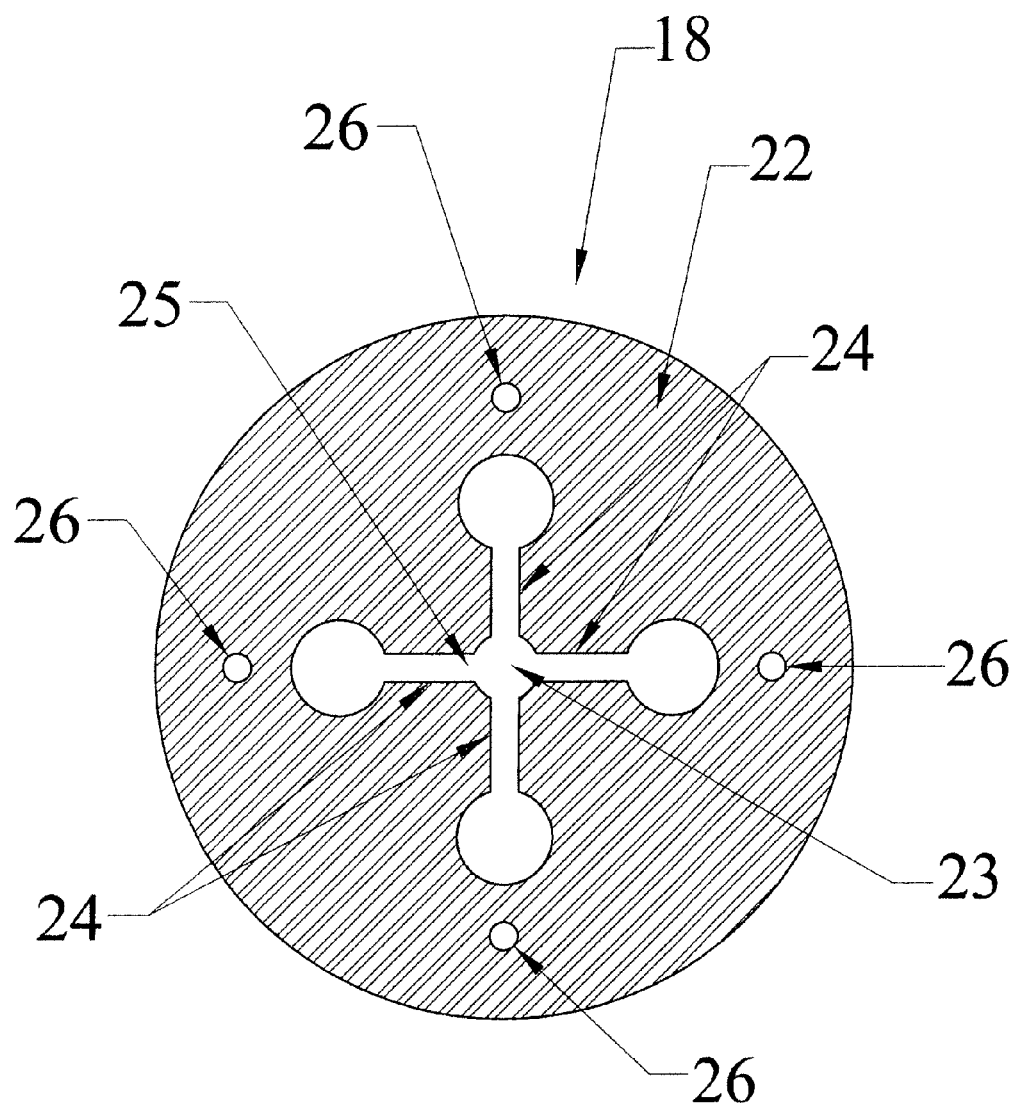
FIG. 10A is a cross-sectional view of the cooling cavities of an extrusion tool as disclosed herein.
Figure 10B:
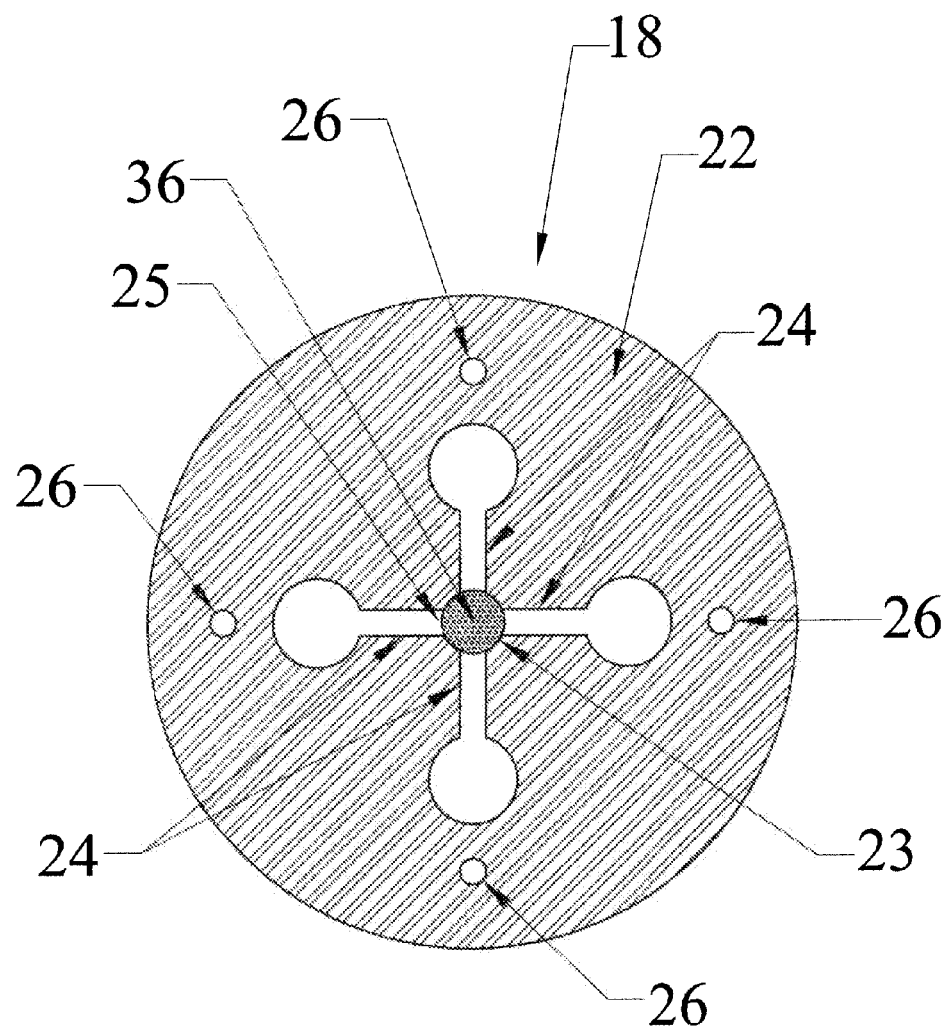
FIG. 10B is a cross-sectional view of the cooling cavities of an extrusion tool as disclosed herein, wherein an extrusion product is disposed with the extrusion transfer channel.

FIG. 10A is a cross-sectional view of the extrusion tool 18 depicting the cooling cavities 24 of the extrusion tool 18. The extrusion tool 18 comprises four cooling cavities 24 disposed radially from the central extrusion transfer channel 23. The extrusion transfer channel 23 comprises an opening 25 into each cooling cavity 24 such that the inside of the extrusion transfer channel 23 is exposed to each of the four cooling cavities 24 through an opening 25. The extrusion tool 18 further comprises four cooling channels 26. FIG. 10B is the same cross-section view of the extrusion tool 18 containing an extruded product 36 disposed in the extrusion transfer channel 23. In this configuration, the extruded product 36 is exposed to the cooling agent in each of the cooling cavities 24 through openings 25 such that the extruded product 36 can be cooled before being extruded through the second extrusion die 21.

Figure 11:
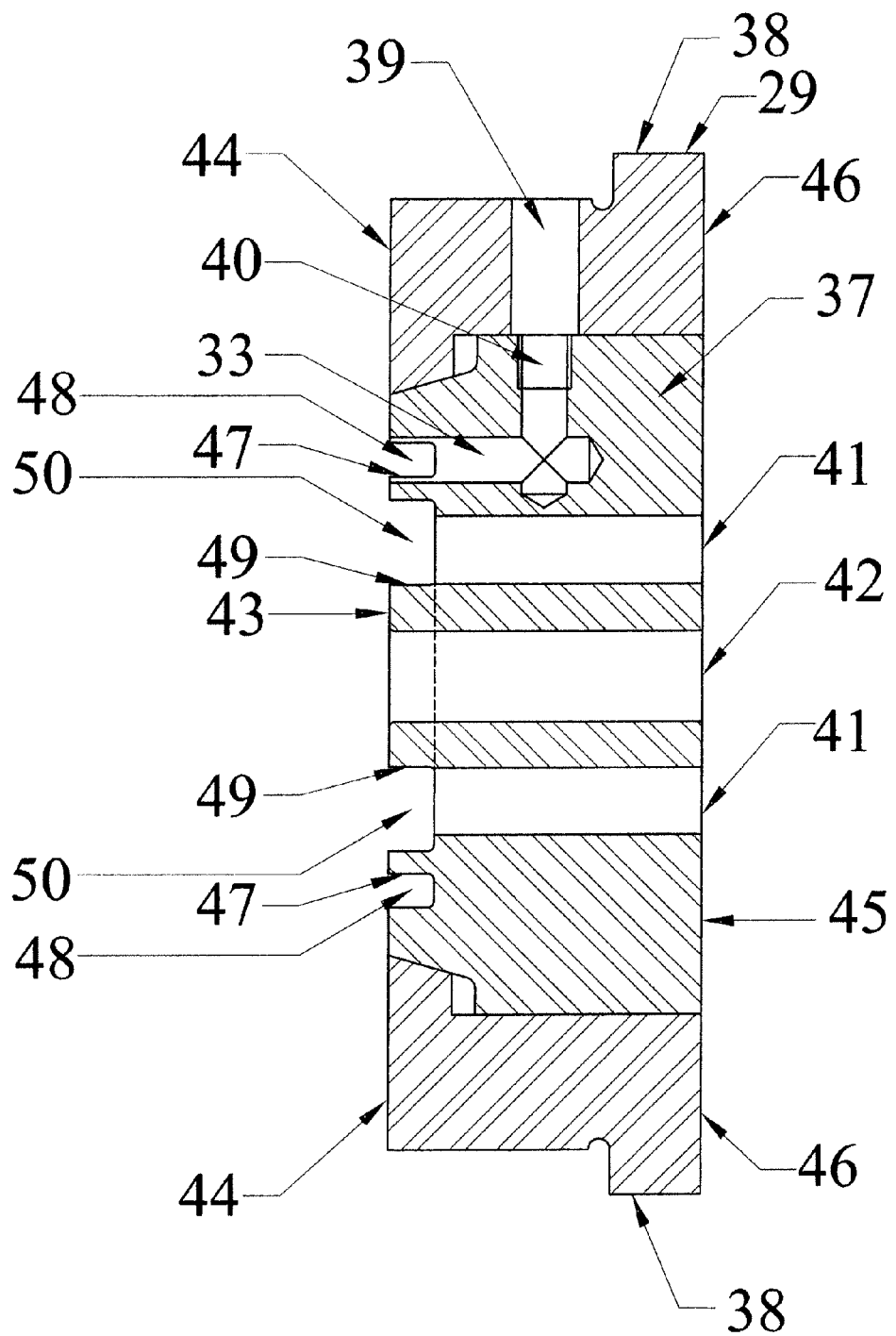
FIG. 11 is a cross-sectional view of a backing manifold engaged in an extrusion press die holder.

FIG. 11 is a cross-sectional view of a backing manifold 37 engaged in an extrusion press die holder 38. The backing manifold 37 and die press holder 38 each comprise a container end 43, 44 and a free end 45, 46 and a cooling agent channel 39, 40 configured to connect to a cooling agent source through the side of the die press holder 38 to the container end 43 of the backing manifold 37. The backing manifold 37 comprises manifold exits 41, which permit the cooling agent to exit the extrusion tool 18. The backing manifold 37 further comprises an extrusion exit 42. In one embodiment, the backing manifold 37 is submerged under water. In another embodiment, the backing manifold 37 is submerged under an oil. The container end 43 of the backing manifold 37 comprises two outer notches 47 which form a cooling agent reservoir 48 when the backing manifold 37 is engaged against the extrusion tool 18. The container end 43 of the backing manifold 37 comprises two inner notches 49 which form a cooling agent exit channel 50 when the backing manifold 37 is engaged against the extrusion tool 18. The cooling agent exit channel 50 is connected to the manifold exits 41.

Figure 12:
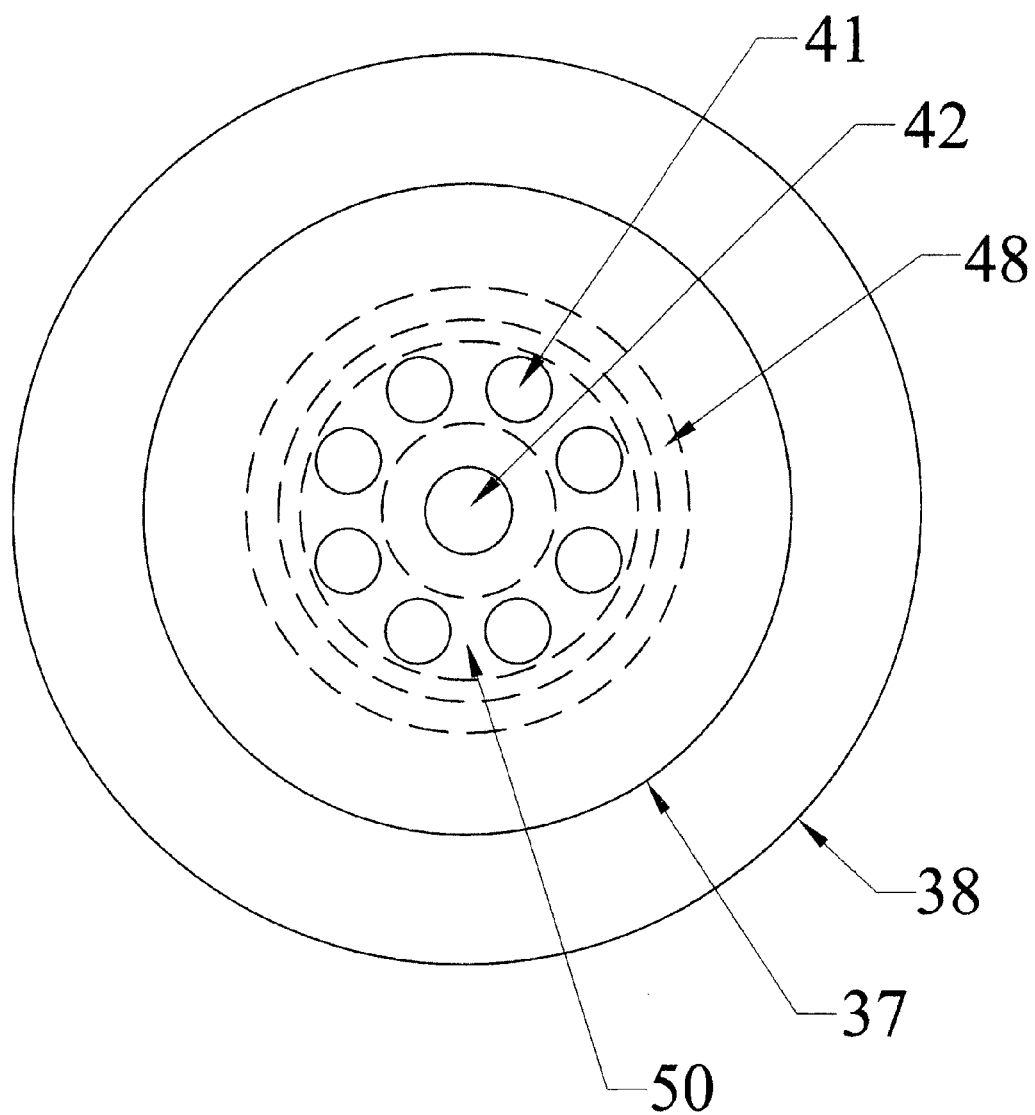
FIG. 12 is an end view of the free end of a backing manifold engaged in an extrusion press die holder.

FIG. 12 is an end-view of the free end of the backing manifold 37 and the extrusion press die holder 38. The backing manifold 37 comprises eight manifold exits 41 radially spaced around the central extrusion exit 42. In accordance with the present disclosure, any number of manifold exits 41 may be used. For example, the backing manifold 37 may comprise from about 4 to about 16 manifold exits 41. In another embodiment, the backing manifold 37 may comprise from about 6 to about 14 manifold exits 41. In a further embodiment, the backing manifold 37 may comprise from about 8 to about 12 manifold exits 41. In still other embodiments, the backing manifold 37 may comprise about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, or about 48 manifold exits 41. The cooling agent reservoir 48 formed by the two outer notches 47 and the cooling agent exit channel 50 formed by the two outer notches 49 are also shown with dashed lines.

In one embodiment, an extrusion press is provided wherein the extrusion press comprises a ram, a container, a load carrier as described herein, a dummy block, an extrusion tool as described herein, a backing manifold, and a die block holder. In one embodiment, the extrusion tool is configured to be positioned entirely within the container of the extrusion tool. In another embodiment, the extrusion tool is configured to be positioned such that at least a portion of the extrusion tool is positioned within the container of the extrusion tool. In a further embodiment, the extrusion tool is configured to be positioned entirely outside of the container of the extrusion press.

Figure 13:
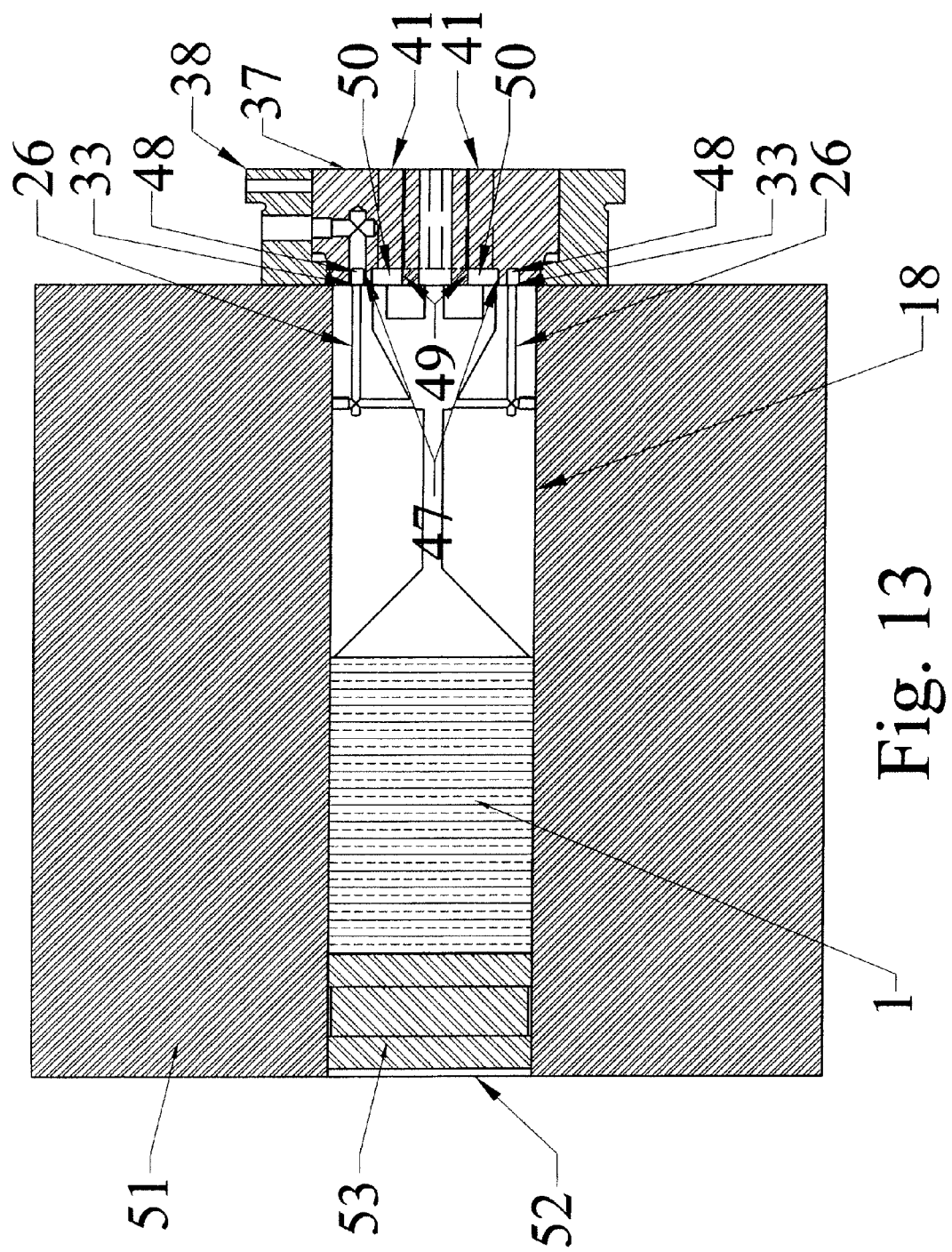
FIG. 13 is a cross-sectional view of a portion of an extrusion press comprising a container, a dummy block, a load carrier as described herein, an extrusion tool as described herein configured within the container, and a backing manifold engaged in a die press holder and against the extrusion tool.

FIG. 13 is a cross-section view of an extrusion press container 51 comprising a central extrusion chamber 52, a dummy block 53, a load carrier 1 as described herein, and an extrusion tool 18 as described herein. The backing manifold 37 as described herein is engaged in the extrusion press die holder 38 and against the extrusion tool 18. In this configuration, the two outer notches 47 in the container end 43 of the backing manifold 37 forms the cooling agent reservoir 48, which distributes the cooling agent in a ring around the extrusion tool 18 and provides cooling agent to the inlets 33 of the cooling agent channels 26. The cooling agent reservoir 48 may be sealed in any suitable manner. In one embodiment, the cooling agent reservoir 48 may be sealed by o-rings. In another embodiment, the cooling agent reservoir 48 may be sealed by gaskets. In a further embodiment, the cooling agent reservoir 48 may be sealed by a metal-to-metal fitting. The two inner notches 49 in the container end 43 of the backing manifold 37 forms the cooling agent exit channel 50, which distributes the cooling agent exhaust in a ring around the extrusion tool 18 and provides a passthrough of the cooling agent exhaust to the manifold exits 41.

In another embodiment, a process for dual-phase hot metal extrusion comprises the steps of: (i) providing a load carrier as described herein; (ii) heating the load carrier to a temperature above the melting point of the second metal material and suitable for extrusion of the load carrier; (iii) equipping the container of an extrusion press with an extrusion tool comprising a first die, a second die, and at least one cooling cavity, as described herein; (iv) providing a cooling agent to the at least one cooling cavity; and (v) extruding the load carrier through the first extrusion die and then through the second extrusion die.

The extrusion products contemplated herein may be used as thermal and/or electrical conductors in any desirable product, process, or application. For example, the extrusion products contemplated herein may be used in consumer products (such as electronics, appliances, and the like), industrial equipment (such as motors, generators, commutators, and the like), and construction (such as window frames, supports, and the like).

The following examples are included to illustrate certain embodiments. Those of skill in the art should, however, in light of the present disclosure, appreciate that modifications can be made in the specific embodiments that are disclosed and still obtain a like or similar result without departing from the spirit and scope of the invention. Therefore, all matter set forth in these examples is to be interpreted as illustrative and shall not be construed as limiting in any way.

EXAMPLE 1

A load carrier was formed from a cylindrical billet of UNS C10200 copper about 6 inches in diameter and about 9 inches in length. The billet was milled using a drill bit to form a load carrier containing twenty-five load chambers. A central load chamber was milled along the central axis of the billet. Twelve load chambers were milled 0.75 inches from the central chamber, each of the twelve load chambers being radially spaced 30° apart. An additional twelve load chambers were milled 1.5 inches from the central chamber, each of these twelve load chambers again being radially spaced 30° apart. Each of the twenty-five load chambers had a depth of between about 4 inches to about 6 inches.

The load carrier and twenty-five fluted spacers, aluminum cylinders, non-fluted spacers, and set screws were ultrasonically cleaned with soap and water, rinsed with water followed by alcohol, and then dried. A fluted spacer containing three flutes was placed in each of the load chambers. The bottom end of the fluted spacer was shaped to match the shape of the drill bit used to mill the load chambers. An aluminum cylinder (6006 aluminum rod) sized to fit in the load chambers was then loaded onto each fluted spacer in each load chamber. The flutes in the fluted spacers were sized to accommodate the increase in volume of aluminum in the load chamber caused by thermal expansion of the aluminum upon heating. A non-fluted spacer was then loaded into each load chamber and then deformed with hammering to form a tight seal within each load chamber. A set screw was then tightened in each load chamber such that the set screw was recessed from the top surface of the load carrier.

EXAMPLE 2

The load carrier containing aluminum produced in Example 1 was heated to an internal temperature of approximately 1600° F., the recommended extrusion temperature of CNS C10200 copper, in a gas furnace. The internal temperature was monitored by a thermocouple placed in the center of a separate UNS C10200 copper billet also present in the furnace. Although this example used a gas furnace to heat the load carrier, induction is also an acceptable method for heating the load carrier. Upon reaching the desired internal temperature, the load carrier was then transferred to a hot extrusion press and immediately extruded through a flow die and into water. The extruded copper material was then drawn to form a rod.

Microscopic evaluation confirmed that the drawn copper rod contained twenty-five filaments, one central filament and an inner and outer ring each containing twelve filaments, of aluminum running axially within the copper rod.

EXAMPLE 3

A load carrier was formed from a cylindrical billet of UNS C10200 copper about 6 inches in diameter and about 9 inches in length. The billet was milled using a drill bit to form a load carrier containing thirty-seven load chambers. After ultrasonic cleaning of all parts, a non-fluted spacer was placed in the bottom of each load chamber. These non-fluted spacers were shaped to substantially eliminate any void space created by the shape of the drill bit. A portion of the extruded copper rod obtained in Example 2 was then loaded into the load chamber followed by a second spacer, which was then deformed with hammering to form a tight seal within each load chamber. A set screw was then tightened in each load chamber such that the set screw was recessed from the top surface of the load carrier.

The load carrier was then heated to an internal temperature of approximately 1600° F. using a gas furnace. Upon reaching the desired internal temperature, the load carrier was then transferred to a hot extrusion press and was immediately extruded through a flow die and into water. The extruded copper material was then drawn to form a rod.

Microscopic evaluation confirmed that the drawn copper rod contained thirty-seven sets of twenty-five aluminum filaments running axially within the copper rod.

EXAMPLE 4

The load carrier formed in Example 1 is heated to an internal temperature of approximately 1600° F., the recommended extrusion temperature of CNS C10200 copper, in a gas furnace. While the load carrier reaches temperature, an extrusion press is equipped with an extrusion tool comprising a first die, a second die, and four cooling cavities positioned therebetween, as described herein. The four cooling cavities are attached to a water source. Upon reaching the desired internal temperature, the load carrier is transferred to the hot extrusion press, and extrusion through the first die is immediately commenced. Upon the commencement of extrusion, the water source is powered to provide water to the four cooling cavities such that the load carrier is extruded through the first die is cooled to a temperature of about 1200° F. or less and is then extruded through the second die to form a copper rod comprising twenty-five filaments of aluminum extending axially through a portion of the copper rod.

When introducing elements of the various embodiment(s) of the present disclosure, the articles "a", "an", "the" and "said" are intended to mean that there are one or more of the elements. The terms "comprising", "including", "containing", and "having" are intended to be inclusive and mean that there may be additional elements other than the listed elements.

The use of individual numerical values are stated as approximations as though the values were preceded by the word "about" or "approximately". Similarly, the numerical values in the various ranges specified in this application, unless expressly indicated otherwise, are stated as approximations as though the minimum and maximum values within the stated ranges were both preceded by the word "about" or "approximately". In this manner, variations above and below the stated ranges can be used to achieve substantially the same results as values within the ranges. As used herein, the terms "about" and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about" or "approximately" will serve to broaden a particular numerical value or range. Thus, as a general matter, "about" or "approximately" broaden the numerical value. Also, the disclosure of ranges is intended as a continuous range including every value between the minimum and maximum values plus the broadening of the range afforded by the use of the term "about" or "approximately." Consequently, recitation of ranges of values herein are merely intended to serve as a shorthand method of referring individually to each separate value falling within the range, unless otherwise indicated herein, and each separate value is incorporated into the specification as if it were individually recited herein.

While several embodiments of the present teachings have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present teachings. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present teachings is/are used. Those skilled in the art will recognize, or be able to ascertain using no more than routine experimentation, many equivalents to the specific embodiments of the present teachings described herein. It is, therefore, to be understood that the foregoing embodiments are presented by way of example only and that, within the scope of the appended claims and equivalents thereto, the present teachings may be practiced otherwise than as specifically described and claimed. The present teachings are directed to each individual feature and/or method described herein. In addition, any combination of two or more such features and/or methods, if such features and/or methods are not mutually inconsistent, is included within the scope of the present teachings.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein are representative of the subject matter which is broadly contemplated by the present invention. It is further understood that the scope of the present invention is not intended to be limited to the embodiment shown herein but is to be accorded the widest scope consistent with the patent law and the principles and novel features disclosed herein.

Alternative embodiments of the claimed disclosure are described herein. Of these, variations of the disclosed embodiments will become apparent to those of ordinary skill in the art upon reading the foregoing disclosure. The inventors expect skilled artisans to employ such variations as appropriate (e.g., altering or combining features or embodiments), and the inventors intend for the invention to be practiced otherwise than as specifically described herein.

Accordingly, this invention includes all modifications and equivalents of the subject matter recited in the claims appended hereto as permitted by applicable law. Moreover, any combination of the above described elements in all possible variations thereof is encompassed by the invention unless otherwise indicated herein or otherwise clearly contradicted by context.

What is claimed is:

1. A method of dual-phase hot metal extrusion comprising the steps of:
    a) providing a load carrier made of a first metal material, wherein the load carrier comprises a load end, a blind end, and at least one load chamber having a depth extending axially from the load end towards the blind end, wherein the at least one load chamber comprises a load material and a void space, wherein the load material comprises a second metal material, the second metal material having a lower melting point than the melting point of the first metal material, and wherein the void space is configured to accommodate at least a portion of the second metal material in its molten form when the load carrier is heated;
    b) heating the load carrier to a temperature above the melting point of the second metal material but below the melting point of the first metal material to form a solid load carrier comprising a liquid metal in the at least one load chamber; and
    c) extruding the heated load carrier to provide an extruded product.

2. The method of claim 1, wherein the void space is provided by a fluted spacer in the at least one load chamber.

3. The method of claim 1, wherein the load carrier comprises at least two load chambers having a first depth and a second depth extending axially from the load end of the load carrier towards the blind end of the load carrier.

4. The method of claim 3, wherein the void space in each of the at least two load chambers is provided by a fluted spacer.

5. The method of claim 3, wherein the first and second depths are different depths.

6. The method of claim 5, wherein the void space in each of the at least two load chambers is provided by a fluted spacer.

7. The method of claim 1, wherein the first metal material comprises copper and the second metal material comprises aluminum, antimony, magnesium, tin, zinc, or any combination thereof.

8. The method of claim 1, further comprising the steps of:
    d) providing a second load carrier made of the first metal material, wherein the load carrier comprises a load end, a blind end, and at least one load chamber having a depth extending axially from the load end towards the blind end, wherein the at least one load chamber comprises a second load material, wherein the second load material is the extruded product formed in step c);

e) heating the second load carrier to a temperature suitable for melting the second metal material in the extruded product formed in step c) and suitable for extruding the second load carrier; and f) extruding the second load carrier to provide a second extruded product.

9. The method of claim 8, wherein the first load carrier is extruded through a flow extrusion die and the second load carrier is extruded through a flow extrusion die.

10. The method of claim 8, wherein the first load carrier is extruded through a flow extrusion die and the second load carrier is extruded the a shear extrusion die.

11. The method of claim 9, wherein the first metal material comprises copper or a copper alloy and the second metal material comprises, aluminum, antimony, magnesium, tin, zinc, or any combination thereof.

12. The method of claim 10, wherein the first metal material comprises copper or a copper alloy and the second metal material comprises, aluminum, antimony, magnesium, tin, zinc, or any combination thereof.

13. The method of claim 10, wherein the method further comprises:

g) providing a third load carrier made of the first metal material, wherein the load carrier comprises a load end, a blind end, and at least one load chamber have a depth extending axially from the load end towards the blind end, wherein the at least one load chamber comprises a third load material, wherein the third load material is the second extruded product formed in step f);

h) heating the second load carrier to a temperature suitable for melting the second metal material in the second extruded product formed in step f) and suitable for extruding the third load carrier; and i) extruding the third load carrier through a shear extrusion die to provide a third extruded product.

14. A method of dual-phase hot metal extrusion comprising the steps of:

(a) providing a load carrier made of a first metal material, wherein the load carrier comprises a load end, a blind end, and at least one load chamber having a depth extending axially from the load end towards the blind end, wherein the at least one load chamber comprises a load material and a void space, wherein the load material comprises a second metal material, the second metal material having a lower melting point than the melting point of the first metal material, and wherein the void space is configured to accommodate at least a portion of the second metal material in its molten form when the load carrier is heated;

(b) heating the load carrier to a temperature above the melting point of the second metal material but below the melting point of the first metal material to form a solid load carrier comprising a liquid metal in the at least one load chamber;

(c) providing an extrusion tool comprising a first extrusion die, a second extrusion die, and a cooling cavity, wherein an extrusion transfer channel extends from the first extrusion die through the cooling cavity to the second extrusion die of the extrusion tool, wherein the portion of the extrusion transfer channel extending through the cooling cavity comprises at least one opening located between the first extrusion die and the second extrusion die, and wherein the cooling cavity comprises at least one cooling port configured to provide a cooling agent at the at least one opening of the extrusion transfer channel;

(d) providing a cooling agent through the at least one cooling port; and (e) extruding the heated load carrier through the extrusion tool to provide an extruded product.

15. The method of claim 14, further comprising the steps of:

(f) providing a second load carrier made of the first metal material, wherein the second load carrier comprises a load end, a blind end, and at least one load chamber having a depth extending axially from the load end towards the blind end, wherein the at least one load chamber comprises a second load material, wherein the second load material is the extruded product formed in step e);

(g) heating the second load carrier to a temperature suitable for melting the second metal material in the extruded product and suitable for extruding the second load carrier; and (h) extruding the second load carrier to provide a second extruded product.

16. The method of claim 14, wherein the cooling agent is selected from the group consisting of water, oil, inert gas, and reactive gas.

17. The method of claim 16, wherein the cooling agent is water.

18. The method of claim 14, wherein the first metal material comprises copper or a copper alloy and the second metal material comprises, aluminum, antimony, magnesium, tin, zinc, or any combination thereof.

19. The method of claim 15, wherein the first load carrier and the second load carrier are extruded through flow extrusion dies.

20. The method of claim 14, wherein the load carrier is extruded at a temperature ranging from about 30% to about 90% of the melting point of the load carrier.

21. The method of claim 14, wherein the load carrier is extruded in an extrusion press having a pressure of about 20 MPa to about 900 MPa.

22. A method of dual-phase hot metal extrusion comprising the steps of:

(a) providing a load carrier made of a first metal material, wherein the load carrier comprises a load end, a blind end, and at least one load chamber having a depth extending axially from the load end towards the blind end, wherein the at least one load chamber comprises a load material and a void space, wherein the load material comprises a second metal material, the second metal material having a lower melting point than the melting point of the first metal material, and wherein the void space is configured to accommodate at least a portion of the second metal material in its molten form when the load carrier is heated;

(b) heating the load carrier to a temperature at which the first and second metal materials form an alloy having a melting point lower than the melting point of the first metal material and the load carrier is extrudable; and (c) extruding the heated load carrier containing the alloy to provide an extruded product.

23. The method of claim 22, wherein the load carrier is extruded at a ram speed of about 0.0005 m/s to about 1 m/s.

24. The method of claim 23, wherein the load carrier is extruded at a ram speed of about 0.01 m/s to about 0.75 m/s.

25. The method of claim 22, wherein the first metal material comprises copper or a copper alloy and the second metal material comprises, aluminum, antimony, magnesium, tin, zinc, or any combination thereof.

* * * * *